(12) United States Patent
Tomioka et al.

(10) Patent No.: US 8,309,631 B2
(45) Date of Patent: Nov. 13, 2012

(54) EPOXY RESIN COMPOSITION, PREPREG, AND FIBER REINFORCED COMPOSITE MATERIAL

(75) Inventors: Nobuyuki Tomioka, Aichi (JP); Shiro Honda, Ehime (JP); Yuki Mitsutsuji, Ehime (JP); Maki Mizuki, Ehime (JP); Takayuki Imaoka, Ehime (JP)

(73) Assignee: Toray Industries, Inc., Tokyo (JP)

( * ) Notice: Subject to any disclaimer, the term of this patent is extended or adjusted under 35 U.S.C. 154(b) by 328 days.

(21) Appl. No.: 12/919,285

(22) PCT Filed: Feb. 26, 2009

(86) PCT No.: PCT/JP2009/053500
§ 371 (c)(1),
(2), (4) Date: Aug. 25, 2010

(87) PCT Pub. No.: WO2009/107697
PCT Pub. Date: Sep. 3, 2009

(65) Prior Publication Data
US 2011/0009528 A1    Jan. 13, 2011

(30) Foreign Application Priority Data
Feb. 26, 2008    (JP) .................................. 2008-043904

(51) Int. Cl.
*C08G 59/38*    (2006.01)
*C08G 59/22*    (2006.01)

(52) U.S. Cl. ........................................ 523/427; 523/428

(58) Field of Classification Search .................. 523/427, 523/428
See application file for complete search history.

(56) References Cited

U.S. PATENT DOCUMENTS

| | | | | |
|---|---|---|---|---|
| 4,216,246 | A * | 8/1980 | Iwasaki et al. ................. | 427/510 |
| 6,756,414 | B2 * | 6/2004 | Kawamoto et al. ............ | 521/137 |
| 7,166,322 | B2 * | 1/2007 | Inui et al. .................... | 427/163.2 |
| 7,208,228 | B2 * | 4/2007 | Brown et al. ................. | 428/413 |
| 7,271,219 | B2 * | 9/2007 | Saito et al. .................... | 525/191 |
| 7,364,645 | B2 * | 4/2008 | Muramoto et al. ............ | 204/486 |
| 2002/0037467 | A1 * | 3/2002 | Watanabe et al. ........... | 430/110.1 |
| 2002/0121442 | A1 * | 9/2002 | Muramoto et al. ............ | 204/485 |
| 2010/0197830 | A1 * | 8/2010 | Hayakawa et al. ........... | 523/400 |
| 2011/0070442 | A1 * | 3/2011 | Asano et al. ................. | 428/402 |
| 2011/0184091 | A1 * | 7/2011 | Mizuki et al. ................. | 523/428 |

FOREIGN PATENT DOCUMENTS

| | | |
|---|---|---|
| EP | 2 154 171 A1 | 2/2010 |
| JP | 62-1717 A | 1/1987 |
| JP | 62-1719 A | 1/1987 |
| JP | 7-278412 A | 10/1995 |
| JP | 2004-27043 A | 1/2004 |
| JP | 2005-225982 A | 8/2005 |
| JP | 2006-52385 A | 2/2006 |
| JP | 2006-77202 A | 3/2006 |
| JP | 2006-233188 A | 9/2006 |
| JP | 2007-314753 A | 12/2007 |
| JP | 2008-94961 A | 4/2008 |
| WO | WO 2005/082982 A1 | 9/2005 |
| WO | WO 2006/077153 A2 | 7/2006 |
| WO | WO 2008/143044 A1 | 11/2008 |

OTHER PUBLICATIONS

International Search Report dated Jun. 2, 2009 in International Application No. PCT/JP2009/053500.

* cited by examiner

*Primary Examiner* — Mark Eashoo
*Assistant Examiner* — Megan McCulley
(74) *Attorney, Agent, or Firm* — Birch, Stewart, Kolasch & Birch, LLP

(57) ABSTRACT

It is an object of the present invention to provide a fiber reinforced composite material combining good properties such as toughness and impact resistance and to provide an epoxy resin composition to obtain this. This object is achieved by the an epoxy resin composition comprising the following [A], [B], [C], and [D]:

[A] a diglycidyl ether-type epoxy resin having a molecular weight of 1,500 or more;
[B] an epoxy resin in which an SP value of a structural unit thereof is greater by 1.5 to 6.5 than an SP value of a structural unit of [A];
[C] a diglycidyl ether-type epoxy resin having a molecular weight of 500 to 1,200; and
[D] an epoxy resin curing agent, in a ratio that satisfies the following formulas (1) to (4):

$$0.2 \leq A/(A+B+C+E) \leq 0.6; \quad (1),$$

$$0.2 \leq B/(A+B+C+E) \leq 0.6; \quad (2),$$

$$0.15 \leq C/(A+B+C+E) \leq 0.4; \text{ and} \quad (3),$$

$$0 \leq E/(A+B+C+E) \leq 0.2, \quad (4)$$

wherein A, B, and C represent weights of [A], [B], and [C], respectively, and E represents a weight of an epoxy resin other than [A], [B], and [C].

10 Claims, No Drawings

EPOXY RESIN COMPOSITION, PREPREG, AND FIBER REINFORCED COMPOSITE MATERIAL

TECHNICAL FIELD

The present invention relates to an epoxy resin composition that yields a cured product used preferably as a matrix resin for a fiber reinforced composite material suitable for sports applications, aircraft applications, and general industrial applications. The invention also relates to a prepreg containing the epoxy resin composition as a matrix resin and to a fiber reinforced composite material obtained by curing the prepreg.

BACKGROUND ART

Fiber reinforced composite materials in which carbon fibers or aramid fibers are used as reinforcing fibers have high specific strength and high specific modulus and are thereby widely used as structural materials for aircrafts and automobiles and for general industrial and sports applications such as tennis rackets, golf shafts, and fishing rods.

In one method of producing a fiber reinforced composite material, sheets of prepreg, which is an intermediate sheet-shaped material prepared by impregnating reinforcing fibers with an uncured matrix resin, are stacked and then heat-cured. Also, a resin-transfer-molding method is used in which a liquid resin is poured into reinforcing fibers placed in a mold and is then heat-cured.

Among these production methods, the method that uses a prepreg has an advantage in that a high-performance fiber reinforced composite material is easily obtained because the orientation of the reinforcing fibers can be strictly controlled and the design flexibility of the laminated structure is high. From the viewpoints of thermal resistance and productivity, a thermosetting resin is mainly used as the matrix resin for the prepreg. An epoxy resin is particularly preferably used because of its mechanical properties such as adhesive properties to the reinforcing fibers.

The epoxy resin has higher elastic modulus but lower toughness than a thermoplastic resin, and therefore the impact resistance of the fiber reinforced composite material is insufficient.

To improve the toughness of an epoxy resin, various attempts have been made; for example, a rubber component or thermoplastic resin having high toughness is added to form a structure including a phase separated from the epoxy resin. However, those methods have problems such as a reduction in elastic modulus, deterioration of thermal resistance, deterioration of processability due to an increase in viscosity, and deterioration of quality such as occurrence of voids. For example, Patent document 1 proposes a method of greatly improving the toughness of an epoxy resin by adding a styrene-butadiene-methyl methacrylate copolymer or a block copolymer such as a block copolymer of butadiene-methyl methacrylate to stabilize the formation of a fine phase-separated structure during the curing process of the epoxy resin. Patent document 2 discloses that the addition of a large amount of a thermoplastic resin, such as a phenoxy resin or polyethersulfone, which forms a separate phase allows a significant improvement in toughness and a significant increase in minimum viscosity; therefore, when the resultant mixture is used as a self-adhesive prepreg for the face plate of a honeycomb panel, sufficient fillets are formed on the bonding surface with the honeycomb core, and high self-adhesive properties are thereby obtained. However, it is inferior in universal use: For example, when using a prepreg for an aircraft primary structural material required to have higher mechanical properties and longer reliability, voids and irregular orientation of fibers are likely to occur in a molded product due to increase in viscosity caused by the addition of the thermoplastic resin, thus not demonstrating enough performance.

A combination of various epoxy resins can compensate for their drawbacks and can provide better-balanced properties than a single component resin. However, with such a combination, a phase-separated structure is generally not formed, and therefore the toughness is improved only slightly, so that the impact resistance of the fiber reinforced composite material is hardly improved. For example, when an amine-type epoxy resin having high elastic modulus is added to a bisphenol-A-type epoxy resin, which is an epoxy resin having high toughness, the resultant toughness and elastic modulus take values between these of the components, and there is the problem in that the impact resistance is not improved.

For example, in Patent documents 3 and 4, an amine-type epoxy resin having high elastic modulus is added to a bisphenol-type epoxy resin, thus significantly improving bending strength in fiber direction and interlayer shear strength that are strongly correlated with compression strength in fiber direction. However, the resin toughness and impact resistance are not sufficiently improved.

PRIOR ART DOCUMENTS

Patent Documents

Patent document 1: WO/2006/077153
Patent document 2: Japanese Patent Application Laid-Open No. 2007-314753
Patent document 3: Japanese Patent Application Laid-Open No. Sho 62-1717
Patent document 4: Japanese Patent Application Laid-Open No. Sho 62-1719

DISCLOSURE OF INVENTION

Problem to be Solved by the Invention

It is an object of the present invention to overcome the drawbacks in the conventional technologies to thereby provide an epoxy resin composition that forms a cured product having both good elastic modulus and toughness and to provide a prepreg and a fiber reinforced composite material that are prepared using the epoxy resin composition.

Means for Solving Problem

To solve the above problem, the present invention provides the following epoxy resin compositions.

[1] An epoxy resin composition comprising the following [A], [B], [C], and [D]:

[A] a diglycidyl ether-type epoxy resin having a molecular weight of 1,500 or more;

[B] an epoxy resin in which an SP value of a structural unit thereof is greater by 1.5 to 6.5 than an SP value of a structural unit of [A];

[C] a diglycidyl ether-type epoxy resin having a molecular weight of 500 to 1,200; and

[D] an epoxy resin curing agent,
in a content ratio that satisfies the following formulas (1) to (4):

$$0.2 \leq A/(A+B+C+E) \leq 0.6; \quad (1),$$

$$0.2 \leq B/(A+B+C+E) \leq 0.6; \quad (2),$$

$$0.15 \leq C/(A+B+C+E) \leq 0.4; \text{ and} \quad (3),$$

$$0 \leq E/(A+B+C+E) \leq 0.2, \quad (4)$$

wherein A, B, and C represent weights of [A], [B], and [C], respectively, and E represents a weight of an epoxy resin other than [A], [B], and [C].

[2] An epoxy resin composition comprising the following [A'], [B'], [C'], and [D']:

[A']: a diglycidyl ether-type epoxy resin having a molecular weight of 1,500 to 5,000;

[B']: an epoxy resin in which an SP value of a structural unit thereof is greater by 1.5 to 6.5 than an SP value of a structural unit of [A'];

[C']: a diglycidyl ether-type epoxy resin having a molecular weight of 300 to 1,200; and

[D']: an aromatic amine-type epoxy resin curing agent;
in a content ratio that satisfies the following formulas (1') to (4'):

$$0.2 \leq A'/(A'+B'+C'+E') \leq 0.6; \quad (1'),$$

$$0.2 \leq B'/(A'+B'+C'+E') \leq 0.6; \quad (2'),$$

$$0.15 \leq C'/(A'+B'+C'+E') \leq 0.4; \text{ and} \quad (3'),$$

$$0 \leq E'/(A'+B'+C'+E') \leq 0.2; \quad (4')$$

wherein A', B', and C' represent weights of [A'], [B'], and [C'], respectively, and E' represents a weight of an epoxy resin other than [A'], [B'], and [C'].

[3] The epoxy resin composition according to the above [1], wherein [B] is an amine-type epoxy resin.

[4] The epoxy resin composition according to the above [2], wherein [B'] is an amine-type epoxy resin.

[5] The epoxy resin composition according to the above [2] or [4], wherein the molecular weight of [C'] is 500 to 1,200.

[6] The epoxy resin composition according to the above [1] or [3], wherein [D] is dicyandiamide or a derivative thereof.

[7] The epoxy resin composition according to the above [2] or [4], wherein [D'] is diaminodiphenylsulfone or a derivative thereof.

[8] A cured epoxy resin product prepared by curing the epoxy resin composition according to the above [1] or [2], wherein the cured epoxy resin product has a phase-separated structure including at least an [A]-rich phase and a [B]-rich phase or an [A']-rich phase and a [B']-rich phase, and wherein a structure period of the phase-separated structure is 0.01 to 5 μm.

[9] A cured epoxy resin product prepared by curing the epoxy resin composition according to the above [1] or [2], wherein the cured epoxy resin product has a sea-island phase-separated structure including at least an [A]-rich phase and a [B]-rich phase or an [A']-rich phase and a [B']-rich phase, and wherein a diameter of islands of one phase is 0.01 to 5 μm.

[10] A prepreg for a fiber reinforced composite material, comprising, as a matrix, the epoxy resin composition according to any one of the above [1] and [2].

[11] A fiber reinforced composite material prepared by curing the prepreg according to the above [10].

[12] A fiber reinforced composite material, comprising a combination of the cured epoxy resin product according to the above [8] and a reinforcing fiber base material.

[13] A fiber reinforced composite material, comprising a combination of the cured epoxy resin product according to the above [9] and a reinforcing fiber base material.

As used herein, [A] represents one of the components contained in the epoxy resin composition of the present invention. In the same manner, each of [B], [C], [D], and [E], and [A'], [B'], [C'], [D'], and [E'] represents one of the components contained in the epoxy resin composition of the present invention.

Effect of the Invention

The present invention can provide an epoxy resin composition that forms a fine phase-separated structure of epoxy resin during curing and yields a cured product having high elastic modulus and high toughness. The obtained fiber reinforced composite material has good static strength properties and also good impact resistance.

BEST MODE(S) FOR CARRYING OUT THE INVENTION

An epoxy resin composition of the present invention contains two diglycidyl ether-type epoxy resins having different molecular weights, an epoxy resin in which the SP value of its structural unit satisfies a certain value, and a certain curing agent. The embodiments of the epoxy resin composition of the present invention may include the following first and second embodiments.

The epoxy resin composition of the first embodiment of the present invention includes the following components [A], [B], [C], and [D] in a content ratio that satisfies the following formulas (1) to (4):

[A]: a diglycidyl ether-type epoxy resin having a molecular weight of 1,500 or more,

[B]: an epoxy resin in which the SP value of its structural unit is greater by 1.5 to 6.5 than the SP value of the structural unit of [A],

[C]: a diglycidyl ether-type epoxy resin having a molecular weight of 500 to 1.20,

[D]: an epoxy resin curing agent, $$0.2 \leq A/(A+B+C+E) \leq 0.6 \quad (1),$$

$$0.2 \leq B/(A+B+C+E) \leq 0.6 \quad (2),$$

$$0.15 \leq C/(A+B+C+E) \leq 0.4 \quad (3),$$

$$0 \leq E/(A+B+C+E) \leq 0.2 \quad (4).$$

(In the above formulas, A, B, and C represent the weights of [A], [B], and [C], respectively, and E represents the weight of an epoxy resin other than [A], [B], and [C].)

The epoxy resin composition of the second embodiment of the present invention comprises the following components [A'], [B'], [C'], and [D'] in a content ratio that satisfies the following formulas (1') to (4'):

[A']: a diglycidyl ether-type epoxy resin having a molecular weight of 1,500 to 5,000,

[B']: an epoxy resin in which the SP value of its structural unit is greater by 1.5 to 6.5 than the SP value of the structural unit of [A'],

[C']: a diglycidyl ether-type epoxy resin having a molecular weight of 300 to 1,200,

[D']: an aromatic amine-type epoxy resin curing agent, $$0.2 \leq A'/(A'+B'+C'+E') \leq 0.6 \quad (1'),$$

$$0.2 \leq B'/(A'+B'+C'+E') \leq 0.6 \quad (2'),$$

$$0.15 \leq C'/(A'+B'+C'+E') \leq 0.4 \quad (3'),$$

$$0 \leq E'/(A'+B'+C'+E') \leq 0.2 \quad (4').$$

(In the above formulas, A', B', and C' represent the weights of [A'], [B'], and [C'], respectively, and E' represents the weight of an epoxy resin other than [A'], [B'], and [C'].)

In the epoxy resin composition of the first embodiment, the above formulas (1) to (4) mean the following. The epoxy resin composition of the first embodiment needs to contain, as epoxy resins, [A]: a diglycidyl ether-type epoxy resin having a molecular weight of 1,500 or more, [B]: an epoxy resin in which the SP value of its structural unit is greater by 1.5 to 6.5 than the SP value of the structural unit of [A], and [C]: a diglycidyl ether-type epoxy resin having a molecular weight of 500 to 1,200. The amount of [A] needs to be 20 to 60 parts by weight based on 100 parts by weight of [A], [B], [C], and the epoxy resin [E] other than [A], [B], and [C] (hereinafter denoted as all the epoxy resins); the amount of [B] needs to be 20 to 60 parts by weight based on 100 parts by weight of all the epoxy resins; and the amount of [C] needs to be 15 to 40 parts by weight based on 100 parts by weight in total of all the epoxy resins. The amount of the epoxy resin [E] other than [A], [B], and [C] needs to be 20 parts by weight or less based on 100 parts by weight of all the epoxy resins.

In the epoxy resin composition of the second embodiment, formulas (1') to (4') mean the following. When the aromatic amine-type epoxy resin curing agent [D'] is used as a curing agent in the epoxy resin composition of the present invention, the epoxy resin composition needs to contain, as epoxy resins, [A'] a diglycidyl ether-type epoxy resin having a molecular weight of 1,500 to 5,000, [B']: an epoxy resin in which the SP value of its structural unit is greater by 1.5 to 6.5 than the SP value of the structural unit of [A'], and [C']: a diglycidyl ether-type epoxy resin having a molecular weight of 300 to 1,200. The amount of [A'] needs to be 20 to 60 parts by weight based on 100 parts by weight of [A'], [B'], [C'], and an epoxy resin [E'] other than [A'], [B'], and [C'] (hereinafter denoted as all the epoxy resins); the amount of [B'] needs to be 20 to 60 parts by weight based on 100 parts by weight of all the epoxy resins; and the amount of [C'] needs to be 15 to 40 parts by weight based on 100 parts by weight of all the epoxy resins. The amount of the epoxy resin [E'] other than [A'], [B'], and [C'] needs to be 20 parts by weight or less based on 100 parts by weight of all the epoxy resins.

The present inventors have found that a resin composition having the above-described specific content ratio is in a homogeneously mixed state before curing reaction and the plurality of epoxy resin components generate phase separation during the curing reaction, and thus it is possible for a fiber reinforced composite material to achieve not only good impregnation moldability but also good mechanical properties including impact resistance. The inventors have conducted extensive studies and found that, when the above requirements are met, the epoxy resins are phase-separated each other during the curing reaction, so that a fiber reinforced composite material having the desired properties can be obtained.

[E] is an epoxy resin other than [A] to [C], as described above. [E'] is an epoxy resin other than [A'] to [C'], as described above. [E] or [E'] may be bisphenol-type epoxy resins, phenol novolac-type epoxy resins, cresol novolac-type epoxy resins, resorcinol-type epoxy resins, phenol aralkyl-type epoxy resins, dicyclopentadiene-type epoxy resins, epoxy resins having a biphenyl skeleton, or urethane-modified epoxy resins. Preferred ranges of [E] and [E'] are 0 to 15 parts by weight.

Other component other than [A] to [E] or other than [A'] to [E'] may be added within a range in which the effect of the present invention is not impaired. Such components may include a thermoplastic resin soluble in the epoxy resins, organic particles such as rubber particles and thermoplastic resin particles, and inorganic particles. A preferred range of the additional component is 0 to 20 parts by weight, and a more preferred range thereof is 0 to 15 parts by weight.

Cured resin products obtained by curing the above epoxy resin compositions have both sufficient elastic modulus and sufficient toughness.

An embodiment of the cured epoxy resin product may be a cured product having a phase-separated structure that includes an [A]-rich phase and a [B]-rich phase or an [A']-rich phase and a [B']-rich phase and has a phase-separated structure period of 0.01 to 5 μm. Such a phase-separated structure allows the cured epoxy resin product to have both sufficient elastic modulus and sufficient toughness.

In each of the resin compositions of the present invention, [A] to [E] or [A'] to [E'] are homogeneously mixed with each other. However, as the molecular weights of these components increase in the curing reaction process during molding, the resin composition is phase-separated into [A]-rich and [B]-rich phases, so-called reaction induced phase separation, and a phase structure including the [A]-rich and [B]-rich phases or [A']-rich and [B']-rich phases is thereby formed. In the present invention, the term "phase-separated structure" refers to a structure in which different phases composed of different main components constitute a structure period of 0.01 μm or more.

On the other hand, a state in which the components are homogeneously mixed at a molecular level is referred to as a compatible state. In the present invention, when different phases containing different main components form a phase-separated structure having a period of less than 0.01 μm, these phases are deemed to be in a compatible state. Whether or not a phase-separated structure is formed can be determined using an electron microscope, a phase-contrast optical microscope, or any of various other methods.

Preferred exemplary embodiments of the cured epoxy resin product in the present invention may include a cured epoxy resin product that has a phase-separated structure including an [A]-rich phase and a [3]-rich phase or an [A']-rich phase and a [B']-rich phase and has a structure period of 0.01 to 5 μm. The structure period of phase separation is defined below. The phase-separated structure can be a continuous two-phase structure or a sea-island structure; therefore, each of these structures is defined below. For the continuous two-phase structure, lines having a certain length are drawn on a microscope photograph, and intersections of the lines and the phase boundaries are extracted, and the distances between adjacent intersections are measured, and then the number average of the distances is determined as the structure period. The above certain length is set on the basis of a microscope photograph as follows. When the structure period is expected to be of the order of 0.01 μm (0.01 μm or more and less than 0.1 μm), a photograph is taken at a magnification of 20,000×, and three 20 mm-long lines on the photograph (1 μm-long lines on the sample) are randomly selected. In the same manner, when the phase-separated structure period is expected to be of the order of 0.1 μm (0.1 μm or more and less than 1 μm), a photograph is taken at a magnification of 2,000×, and three 20 mm-long lines on the photograph (10 μm-long lines on the sample) are randomly selected. When the phase-separated structure period is expected to be of the order of 1 μm (1 μm or more and less than 10 μm), a photograph is taken at a magnification of 200×, and three 20 mm-long lines on the photograph (100 μm-long lines on the sample) are randomly selected. If the phase-separated structure period measured is out of the expected order, the lengths are re-measured at a magnification suitable for the order of the actual structure period, and those are employed. For the sea-island structure, the structure period of phase separation is the number average of the distances between islands of one phase that are present in certain regions in a microscope photograph. Even when the islands of one phase have ellipsoidal or irregular shapes or circular or ellipsoidal shapes formed of two or more layers, the minimum distances between the islands of one phase are used.

Other preferred exemplary embodiments of the cured epoxy resin product in the present invention may include a cured epoxy resin product having a sea-island phase-separated structure that includes an [A]-rich phase and a [B]-rich phase or an [A']-rich phase and a [B']-rich phase, of which islands have a diameter of 0.01 to 5 μm. The diameter of the islands of one phase represents the size of the islands of one phase in the sea-island structure and is the number average in certain regions. When the islands of one phase are ellipsoidal, their major axes are used. When the islands have irregular shapes, the diameters of circumcircles are used. When the islands are circles or ellipsoids formed of two or more layers, the diameters of the outermost circles or the major axes of the outermost ellipsoids are used. For the sea-island structure, the major axes of all the islands of one phase present in the certain regions are measured, and the number average of the major axes is used as the diameter of the island phase.

Depending on the content ratio between [A] and [B], the structure period does not always reflect whether or not the properties of the cured epoxy resin product are good. In some cases, the diameter of the island phase reflects these properties and is more preferred. Specifically, when the content of [A] is small, the diameter of the island phase tends to reflect the properties. A similar tendency is observed in the relation between the content ratio between [A'] and [B'] and the properties of the cured epoxy resin product containing those.

As described above, when the structure period of phase separation and the diameter of the islands of one phase are measured, a microscope photograph including the certain regions is taken. The certain regions are set on the basis of a microscope photograph as follows. When the phase-separated structure period is expected to be of the order of 0.01 μm (0.01 μm or more and less than 0.1 μm), a photograph is taken at a magnification of 20,000×, and three 4 mm-square regions on the photograph (0.2 μm-square regions on the sample) are randomly selected and used as the certain regions. In the same manner, when the phase-separated structure period is expected to be of the order of 0.1 μm (0.1 μm or more and less than 1 μm), a photograph is taken at a magnification of 2,000×, and three 4 mm-square regions on the photograph (2 μm-square regions on the sample) are randomly selected and used as the certain regions. Also in the same manner, when the phase-separated structure period is expected to be of the order of 1 μm (1 μm or more and less than 10 μm), a photograph is taken at a magnification of 200×, and three 4 mm-square regions on the photograph (20 μm-square regions on the sample) are randomly selected and used as the certain regions. If the phase-separated structure period measured is not of the expected order, the measurement on the certain regions is again performed at a magnification suitable for the order of the actual structure period, and those are employed.

The phase-separated structure of the cured resin product can be determined by observation of its cross-section under a scanning electron microscope or a transmission electron microscope. If necessary, the cross-section may be stained with osmium or the like. The staining may be carried out by an ordinary method.

The structure period and the diameter of the islands of one phase are in the range of preferably 0.01 to 5 μm and more preferably 0.01 to 1 μm. When the structure period is less than 0.01 μm, the toughness of the cured resin product may be insufficient. When the structure period exceeds 5 μm, the phase-separated structure period may become larger than the regions between single fibers of a fiber reinforced composite material during its production, and therefore a sufficient toughness improving effect may not be obtained.

The epoxy resin composition of the present invention, its components are mixed so as to satisfy the above conditions, and this allows reaction-induced phase separation to occur. Examples of the components and the like of each epoxy resin composition of the present invention will be described below in more detail.

The epoxy resin composition of the first embodiment needs to contain, as [A], a diglycidyl ether-type epoxy resin having a molecular weight of 1,500 or more in an amount of 20 to 60 parts by weight based on 100 parts by weight in total of all the epoxy resins. Preferably, the amount of this diglycidyl ether-type epoxy resin contained is 30 to 50 parts by weight based on 100 parts by weight of all the epoxy resins. When the amount is less than 20 parts by weight, it is difficult to form a phase-separated structure in the cured product, and therefore its toughness is insufficient. When the amount exceeds 60 parts by weight, the elastic modulus and also thermal resistance of the cured product are insufficient, thus may leading to deflection and deformation of a fiber reinforced composite material during molding and use.

When the molecular weight of [A] is less than 1,500, it is difficult to form a phase-separated structure in the cured product. In such a case, its toughness is insufficient, and therefore the impact resistance of a fiber reinforced composite material is insufficient. It is preferable, in terms of the ease of impregnation of reinforcing fibers with the resin composition and the thermal resistance of a fiber reinforced composite material, that the molecular weight of [A] be 5,000 or less. Preferably, the upper limit of the molecular weight of [A] is 5,000 or less. From the viewpoint of toughness, there is less need to set the upper limit of the molecular weight of [A]. However, when the molecular weight exceeds 5,000, the phase-separated structure of the cured product is coarse, and its thermal resistance is insufficient, and additionally the impact resistance of a fiber reinforced composite material is insufficient, thus may leading to deflection and deformation during use. When the molecular weight of [A] exceeds 5,000, the minimum viscosity of the resin composition becomes too high. Therefore, when such a resin composition is used for a prepreg for an aircraft primary structural material, impregnation failure may occur during pre-impregnation process, and this tends to cause problems such as occurrence of voids in a molded body.

In the second embodiment of the epoxy resin composition of the present invention, when the aromatic amine-type epoxy resin curing agent [D'] is used as a curing agent, the epoxy resin composition needs to contain, as [A'], a diglycidyl ether-type epoxy resin having a molecular weight in the range of 1,500 to 5,000 in an amount of 20 to 60 parts by weight based on 100 parts by weight of all the epoxy resins. Preferably, the amount of this diglycidyl ether-type epoxy resin contained is 30 to 50 parts by weight based on 100 parts by weight of all the epoxy resins. When the amount is less than 20 parts by weight, it is difficult to form a phase-separated structure in the cured product, and therefore its toughness is insufficient.

When the amount exceeds 60 parts by weight, the elastic modulus and also thermal resistance of the cured product are insufficient, thus may leading to deflection and deformation of a fiber reinforced composite material during molding and use.

When the molecular weight of [A'] is less than 1,500, it is difficult to form a phase-separated structure in the cured product, and its toughness is insufficient. When the molecular weight exceeds 5,000, the phase-separated structure of the cured product is coarse, and its thermal resistance is insufficient, and additionally the impact resistance of a fiber reinforced composite material is insufficient, thus may leading to deflection and deformation during use. When the molecular weight of [A'] exceeds 5,000, the minimum viscosity of the resin composition becomes too high. Therefore, when such a resin composition is used for a prepreg for an aircraft primary structural material, impregnation failure may occur during pre-impregnation process, and this tends to cause problems such as occurrence of voids in a molded body. When the aromatic amine-type epoxy resin curing agent [D'] is used as a curing agent, then since its rate of reaction with an epoxy resin is lower than that of an ordinary epoxy resin curing agent, the phase-separated structure is coarse or uniform in the range where the molecular weight of [A'] exceeds 5,000; thus, a stable phase-separated structure is not obtained.

In the present invention, no particular limitation is imposed on the epoxy resin uses as [A] or [A'] so long as it is a diglycidyl ether-type epoxy resin having a certain molecular weight. However, a bisphenol-type epoxy resin is used particularly preferably. Generally, commercial products of epoxy resins have certain molecular weight distributions generated during their production processes. The above molecular weight of an epoxy resin is a relative molecular weight determined using a polystyrene standard sample by GPC (Gel Permeation Chromatography). Such bisphenol-type epoxy resins to be usable may include bisphenol A-type epoxy resins, bisphenol F-type epoxy resins, bisphenol AD-type epoxy resins, bisphenol S-type epoxy resins, halogen substitution and alkyl substitution products of these bisphenol-type epoxy resins that have substituted aromatic rings, and hydrogenated products of these bisphenol-type epoxy resins that have hydrogenated aromatic rings. These may be used in combination of two or more. As described above, commercial products of epoxy resins have certain molecular weight distributions. Therefore, to prepare a resin composition containing a certain amount of [A] or [A'] using any of the above epoxy resins as a raw material, it is preferable to use, as the raw material, an epoxy resin containing a bisphenol-type epoxy having a molecular weight of 1,500 or more as a main component. The molecular weight of the epoxy resin is a relative molecular weight determined using a polystyrene standard sample by GPC.

Specific examples of these epoxy resins include the following.

Examples of the commercial products of the bisphenol A-type epoxy resins may include jER1004, jER1004F, jER1004AF, jER1005F, jER1007, and jER1009 (products of Japan Epoxy resin Co., Ltd., "jER" used herein and below is a registered trademarks of the company).

Examples of the commercial products of brominated bisphenol A-type epoxy resins may include jER5057 (products of Japan Epoxy resin Co., Ltd.).

Examples of the commercial products of the hydrogenated bisphenol A-type epoxy resins may include ST4100D and ST5100 (products of Tohto Kasei Co., Ltd.).

Examples of the commercial products of the bisphenol F-type epoxy resins may include jER4004P, jER4005P, jER4007P (products of Japan Epoxy resin Co., Ltd.), and EPOTOHTO YDF2004 (product of Tohto Kasei Co., Ltd., "EPOTOHTO" is a registered trademark of the company).

Among them, the bisphenol A-type epoxy resins and the bisphenol F-type epoxy resins are preferred because of their well balanced thermal resistance, elastic modulus, and toughness.

The epoxy resin composition of the first embodiment of the present invention needs to contain, as [B], an epoxy resin in which the SP value of its structural unit is greater by 1.5 to 6.5 than the SP value of the structural unit of [A] in an amount of 20 to 60 parts by weight based on 100 parts by weight of all the epoxy resins. Preferably, the amount of this epoxy resin contained is 30 to 50 parts by weight based on 100 parts by weight of all the epoxy resins. When the amount is less than 20 parts by weight, the elastic modulus of the cured product is insufficient, and additionally it is difficult to form a phase-separated structure in the cured product, and thus its toughness is insufficient. When the amount exceeds 60 parts by weight, the ductility of the cured product is insufficient, and its toughness is insufficient.

The epoxy resin composition of the second embodiment of the present invention needs to contain, as [B'], an epoxy resin in which the SP value of its structural unit is greater by 1.5 to 6.5 than the SP value of the structural unit of [A'] in an amount of 20 to 60 parts by weight based on 100 parts by weight of all the epoxy resins. Preferably, the amount of this epoxy resin contained is 30 to 50 parts by weight based on 100 parts by weight of all the epoxy resins. When the amount is less than 20 parts by weight, the elastic modulus of the cured product is insufficient, and additionally it is difficult to form a phase-separated structure in the cured product, and thus its toughness is insufficient. When the amount exceeds 60 parts by weight, the ductility of the cured product is insufficient, and its toughness is insufficient.

The "structural unit" refers to a partial chemical structure that is contained in a cured epoxy resin product formed through the curing reaction of epoxy resin components with an epoxy resin curing agent and is originated from the epoxy resin components. For example, the structural unit of an epoxy resin component of chemical formula (I) is represented by chemical formula (II).

[Chemical Formula 1]

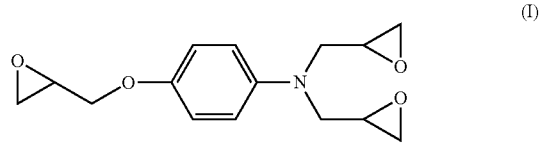

(I)

[Chemical Formula 2]

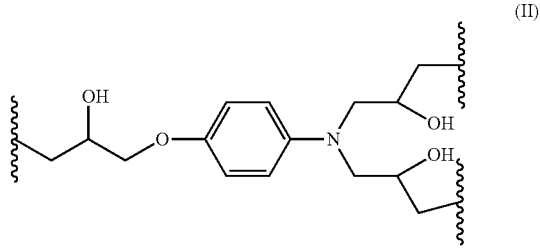

(II)

The SP value is a generally known solubility parameter and is used as a measure of solubility and compatibility. The SP value is computed using physical properties such as heat of vaporization or is estimated from a molecular structure. In the present invention, the SP value used is computed from a molecular structure according to a method by Fedors described in Polym. Eng. Sci., 14(2), 147-154 (1974), and the unit of the SP value used is $(cal/cm^3)^{1/2}$.

When a value obtained by subtracting the SP value of the structure unit of [A] from the SP value of the structure unit of [B] is not 1.5 or more, the cured product has a homogeneous structure which does not exhibit phase separation, and its toughness is insufficient. When a value obtained by subtracting the SP value of the structure unit of [A] from the SP value of the structure unit of [B] is greater than 6.5, the phase-separated structure of the cured product is coarse. Then, both are not mixed with each other when the resin composition is prepared, so that a non-homogeneous resin composition is formed. This may adversely affect the ease of impregnation of reinforcing fibers. The disadvantages related to the difference between the SP value of the structure unit of [B] and the SP value of the structure unit of [A] are the same as above.

Among generally known epoxy resins, [B] and [B'] are classed as those including structural units having particularly high SP values. Therefore, an epoxy resin having a highly polar skeleton or an epoxy resin having a large number of epoxy groups (i.e., high epoxy equivalent) may be preferably used.

Specific examples may include: highly polar epoxy resins such as urethane-modified epoxy resins and isocyanurate ring-containing epoxy resins; and epoxy resins having low epoxy equivalent such as amine-type epoxy resins, polyfunctional novolac-type epoxy resins, and aliphatic polyfunctional epoxy resins.

Among the above specific examples, amine-type epoxy resins are preferably used as [B] or [B'] because they provide a homogeneously mixed resin composition, facilitate the occurrence of phase separation in a cured product, and give good elastic modulus and thermal resistance. Among the amine-type epoxy resins, the use of a trifunctional amine-type epoxy resin easily allows a cured product to have well-balanced elastic modulus and toughness.

Examples of the amine-type epoxy resin that can be used may include tetraglycidyldiaminodiphenylmethane, triglycidylaminophenol, triglycidylaminocresol, diglycidylaniline, diglycidyltoluidine, tetraglycidylxylylenediamine, and halogen substitution, alkyl substitution, and hydrogenated products thereof. Examples of the tetraglycidyldiaminodiphenylmethane that can be used may include "Sumi-Epoxy (registered trademark)" ELM434 (product of Sumitomo Chemical Co., Ltd.), YH434L (product of Tohto Kasei Co., Ltd), "jER (registered trademark)" 604 (product of Japan Epoxy resin Co., Ltd.), and "Araldite (registered trademark)" MY720 and MY721 (products of Huntsman Advanced Materials). Examples of the triglycidylaminophenol and triglycidylaminocresol that can be used may include "Sumi-Epoxy (registered trademark)" ELM100 and ELM120 (product of Sumitomo Chemical Co., Ltd.), "Araldite (registered trademark)" MY0500, MY0510, and MY0600 (products of Huntsman Advanced Materials), and "jER (registered trademark)" 630 (product of Japan Epoxy resin Co., Ltd.). Examples of the diglycidylaniline that can be used may include GAN (product of Nippon Kayaku Co., Ltd.). Examples of the diglycidyltoluidine that can be used may include GOT (product of Nippon Kayaku Co., Ltd.). Examples of the tetraglycidylxylylenediamine and hydrogenated products thereof may include "TETRAD (registered trademark)"-X and "TETRAD (registered trademark)"-C (products of MITSUBISHI GAS CHEMICAL COMPANY, INC.). Among them, trifunctional aminophenol-type epoxy resins are more preferred because they have low viscosity and provide a cured product having well-balance elastic modulus and toughness.

The epoxy resin composition of the first embodiment of the present invention needs to contain, as [C], a diglycidyl ether-type epoxy resin having a molecular weight of 500 to 1,200 in an amount of 15 to 40 parts by weight based on 100 parts by weight of all the epoxy resins. Preferably, the amount of this diglycidyl ether-type epoxy resin contained is 20 to 35 parts by weight based on 100 parts by weight of all the epoxy resins. [C] is compatible with both epoxy resins [A] and [B] and therefore delays the initiation of phase separation of the [A]-rich phase and the [B]-rich phase. This allows the curing reaction to be completed before the phase-separated structure becomes coarse, and the phase-separated structure period can be fixed at 5 μm or less; therefore, good mechanical properties can be obtained.

When the molecular weight of [C] is less than 500, [C] is easily incorporated into the [A]-rich or [B]-rich phase. In such a case, the compatibilizing effect is insufficient, and therefore a coarse phase-separated structure or a homogeneously mixed structure is formed, so that the impact resistance of a fiber reinforced composite material is insufficient. When the molecular weight exceeds 1,200, [C] is easily incorporated into the [A]-rich phase, and therefore the effect of retarding the coarsening of the phase-separated structure is low.

The epoxy resin composition of the second embodiment of the present invention needs to contain, as [C'], a diglycidyl ether-type epoxy resin having a molecular weight of 300 to 1,200 in an amount of 15 to 40 parts by weight based on 100 parts by weight of all the epoxy resins. Preferably, the molecular weight is 500 to 1,200, and the amount of [C'] contained is 20 to 35 parts by weight based on 100 parts by weight of all the epoxy resins. [C'] is compatible with both epoxy resins [A]' and [B'] and therefore delays the initiation of phase separation of the [A']-rich phase and the [B']-rich phase. This allows the curing reaction to be completed before the phase-separated structure becomes coarse, and the phase-separated structure period can be fixed at 5 μm or less. Therefore, good mechanical properties can be obtained.

When the molecular weight of [C'] is less than 300, [C'] is easily incorporated into the [A']-rich or [B']-rich phase. In such a case, the compatibilizing effect is insufficient, and therefore a coarse phase-separated structure or a homogeneously mixed structure is formed, so that the impact resistance of a fiber reinforced composite material is insufficient. When the molecular weight exceeds 1,200, [C'] is easily incorporated into the [A']-rich phase, and therefore the effect of retarding the coarsening of the phase-separated structure is low.

In the epoxy resin composition of the second embodiment of the present invention, the aromatic amine-type epoxy resin curing agent [D'] is used as a curing agent. The reaction rate of [D'] with an epoxy resin is lower than that of an ordinary epoxy resin curing agent. Therefore, fine-scale phase separation occurs stably even when the molecular weight of [C] is smaller.

When the content of [C] or [C'] is less than 15 parts by weight, it is difficult to obtain a phase-separated structure having a period of 5 μm or less. Therefore, the phase-separated structure period becomes greater than the regions between single fibers in a fiber reinforced composite material, so that the produced fiber reinforced composite material cannot exert a sufficient toughness improving effect. When the amount exceeds 40 parts by weight, it is difficult to form a phase-separated structure of 0.01 μm or more, and therefore the toughness of the cured product is insufficient. Also in this case, the produced fiber reinforced composite material cannot exert a sufficient toughness improving effect.

The phase-separated structure period is determined by the balance between the formation rate of phase separation and the rate of curing reaction. Therefore, an appropriate content of [C] or [C'] is adjusted within the range of 15 to 40 parts by weight according to the type of the curing agent.

No particular limitation is imposed on epoxy resins [C] and [C'], so long as they are diglycidyl ether-type epoxy resins having molecular weights in a certain range. Particularly, bisphenol-type epoxy resins may be preferably used. Examples of the bisphenol-type epoxy resins that can be used may include bisphenol A-type epoxy resins, bisphenol F-type epoxy resins, bisphenol AD-type epoxy resins, bisphenol S-type epoxy resins, and halogen substitution, alkyl substitution, and hydrogenated products thereof. The molecular weights of these epoxy resins are determined using a polystyrene standard sample by GPC, as in [A] or [A'].

Examples of the commercial product that can be preferably used as a main component of [C] or [C'] and contains as a main component a diglycidyl ether-type epoxy resin having a molecular weight of 1,200 or less may include the following. Examples of the commercial product of the bisphenol A-type epoxy resin may include jER825, jER826, jER827, jER828, jER834, jER1001, and jER1002 (products of Japan Epoxy resin Co., Ltd., "jER": registered trademark). Examples of the commercial product of a brominated bisphenol A-type epoxy resin may include Epc152, Epc153 (products of DIC Corporation), jER5050, and jER5051 (products of Japan Epoxy resin Co., Ltd.). Examples of the commercial product of the hydrogenated bisphenol A-type epoxy resin may include DENACOL EX-252 (product of Nagase ChemteX Corporation, "DENACOL" is a registered trademark of the company), ST3000, ST5080, and ST4000D (products of Tohto Kasei Co., Ltd.). Examples of the commercial product of the bisphenol F-type epoxy resin may include jER806, jER807, jER4002P (products of Japan Epoxy resin Co., Ltd.), and EPOTOHTO YDF2001 (product of Tohto Kasei Co., Ltd., "EPOTOHTO" is a registered trademark of the company).

Among them, bisphenol A-type epoxy resins and bisphenol F-type epoxy resins are preferred as the component of [C] or [C'] because they have well-balanced thermal resistance, elastic modulus, and toughness.

The epoxy resin curing agents [D] and [D'] used in the epoxy resin composition of the present invention are components necessary to cure the epoxy resins. No particular limitation is imposed on these epoxy resin curing agents as long as they can cure epoxy resins. They may be curing agents, such as amines or acid anhydrides, that initiate addition reaction and may be curing catalysts that induce addition polymerization such as cationic polymerization or anionic polymerization.

Aliphatic amine-type epoxy resin curing agents have good mechanical properties and thermal resistance and can be used as the epoxy resin curing agent [D] in the epoxy resin composition of the first embodiment of the present invention. In particular, dicyandiamide and derivatives thereof are suitable mainly for sports applications because they have well-balanced elasticity and ductility and provide good storage stability of the resin composition.

The derivatives of dicyandiamide are prepared by bonding various compounds to dicyandiamide, and examples of the derivatives may include reaction products with epoxy resins and reaction products with vinyl compounds and acrylic compounds.

When dicyandiamide or a derivative thereof is used as [D], the amount thereof is preferably, in terms of thermal resistance and mechanical properties, 1 to 10 parts by weight and more preferably 2 to 8 parts by weight based on 100 parts by weight of the epoxy resins in the epoxy resin composition. When the amount is less than 1 part by weight, the crosslinking density of the cured product is insufficient. In such a case, its elastic modulus may be insufficient, and therefore its mechanical properties may be poor. When the amount exceeds 10 parts by weight, the crosslinking density of the cured product become high In such case, its plastic deformation capacity may become low and therefore, the impact resistance of the cured product may be poor.

Powder of dicyandiamide or a derivative thereof may be added, as [D], to the resins. This is preferred from the viewpoints of storage stability at room temperature and stability of viscosity during pre-impregnation. When the powder of dicyandiamide or a derivative thereof is added to the resins, the average particle size of the powder is preferably 10 μm or less and more preferably 7 μm or less. When the average particle size of the powder exceeds 10 μm and the resin composition is used for, for example, a prepreg, dicyandiamide or a derivative thereof may not be introduced into reinforcing fiber bundles during impregnation of the reinforcing fiber bundles with the resin composition by heating and pressurization and may remain on the surface layers of the fiber bundles.

The commercial products of dicyandiamide may include DICY-7 and DICY-15 (products of Japan Epoxy resin Co., Ltd.).

Dicyandiamide may be used alone or in combination with a curing catalyst for dicyandiamide or with another epoxy resin curing agent. The curing catalyst for dicyandiamide used in combination may be ureas, imidazoles, and Lewis acid catalysts, and the epoxy resin curing agent may be aromatic amine curing agents, alicyclic amine curing agents, and acid anhydride curing agents. The commercial products of ureas may include DCMU99 (product of Hodogaya Chemical Co., LTD.), Omicure24, Omicure52, and Omicure94 (products of CVC Specialty Chemicals, Inc.). The commercial products of imidazoles may include 2MZ, 22Z, and 2E4MZ (product of Shikoku Chemicals Corporation). The Lewis acid catalysts may be complexes of halogenated boron and a base such as a boron trifluoride-piperidine complex, a boron trifluoride-monoethylamine complex, a boron trifluoride-triethanolamine complex, or a boron trichloride-octylamine complex.

Diaminodiphenylsulfone or a derivative thereof may be preferably used as the aromatic amine-type epoxy resin curing agent [D'] in the epoxy resin composition of the second embodiment of the present invention and is suitable mainly for aircraft applications because good elastic modulus, ductility, and also thermal resistance can be obtained.

Generally, the curing reaction of an aromatic amine-type epoxy resin curing agent [D'] with an epoxy resin is slow. Therefore, even when the molecular weight of [C'] is as low as 300 to 1,200, a fine phase-separated structure can be stably formed.

In a molding method, such as a resin transfer molding method, a liquid resin composition having low viscosity is preferably used. In such a molding method, any of liquid amine curing agents such as liquid aliphatic amines, liquid alicyclic amines, and liquid aromatic amines may be used as the curing agent.

For the purpose of improving the workability of the epoxy resin composition of the present invention by adjusting their viscoelasticity in an uncured state and of improving the elastic modulus and thermal resistance of the cured resin products, an epoxy resin [E] or [E'] may be added to the epoxy resin compositions within a range that does not affect the phase-separated structures. As described above, [E] is an optional component other than [A] to [D] in the epoxy resin composition of the first embodiment. [E'] is an optional component other than [A'] to [D'] in the epoxy resin composition of the second embodiment. Only one type of [E] or [E'] may be added, and alternatively a combination of two or more thereof may be added. Specific examples of the epoxy resins [E] or [E'] may include bisphenol-type epoxy resins, phenol novolac-type epoxy resins, cresol novolac-type epoxy resins, resorcinol-type epoxy resins, phenol aralkyl-type epoxy resins, dicyclopentadiene-type epoxy resins, epoxy resins having a biphenyl skeleton, and urethane-modified epoxy resins.

The commercial products of the phenol novolac-type epoxy resins may include "Epikote (registered trademark)" 152, "Epikote (registered trademark)" 154 (products of Japan Epoxy resin Co., Ltd.), "EPICLON (registered trademark)" N-740, "EPICLON (registered trademark)" N-770, and "EPICLON (registered trademark)" N-775 (products of DIC Corporation).

The commercial products of the cresol novolac-type epoxy resins include "EPICLON (registered trademark)" N-660, "EPICLON (registered trademark)" N-665, "EPICLON (registered trademark)" N-670, "EPICLON (registered trademark)" N-673, "EPICLON (registered trademark)" N-695 (products of DIC Corporation), EOCN-1020, EOCN-102S, and EOCN-104S (products of Nippon Kayaku Co., Ltd.).

Specific examples of the resorcinol-type epoxy resins may include "DENACOL (registered trademark)" EX-201 (product of Nagase ChemteX Corporation).

The commercial products of the dicyclopentadiene-type epoxy resins may include "EPICLON (registered trademark)" HP7200, "EPICLON (registered trademark)" HP7200L, "EPICLON (registered trademark)" HP7200H (products of DIC Corporation), Tactix558 (product of Huntsman Advanced Materials), XD-1000-1L, and XD-1000-2L (products of Nippon Kayaku Co., Ltd.).

The commercial products of the epoxy resins having a biphenyl skeleton may include "Epikote (registered trademark)" YX4000H, "Epikote (registered trademark)" YX4000, "Epikote (registered trademark)" YL6616 (products of Japan Epoxy resin Co., Ltd.), and NC-3000 (product of Nippon Kayaku Co., Ltd.).

The commercial products of urethane- and isocyanate-modified epoxy resins may include AER4152 (product of Asahi Kasei Epoxy Co., Ltd.) and ACR1348 (product of ADEKA Corporation), each having an oxazolidone ring.

In a molding method, such as a resin transfer molding method, a liquid resin composition having low viscosity is preferably used. In such a molding method, a low-viscosity epoxy resin such as an aliphatic epoxy resin or an alicyclic epoxy resin may be used as [E] or [E'].

To improve the tackiness and drapability of a prepreg by controlling the viscoelasticity of an epoxy resin composition of the present invention and to improve the mechanical properties, such as impact resistance, of a fiber reinforced composite material, any of a thermoplastic resin soluble in the epoxy resins, organic particles such as rubber particles and thermoplastic resin particles, inorganic particles, and the like may be added to the epoxy resin composition.

A thermoplastic resin having a hydrogen-bonding functional group that is expected to exert an effect of improving the adhesion properties between the resins and the reinforcing fibers is preferably used as the thermoplastic resin soluble in the epoxy resins.

The hydrogen-bonding functional group may be an alcoholic hydroxyl group, an amide bond, or a sulfonyl group.

The thermoplastic resin having an alcoholic hydroxyl group may be a polyvinyl acetal resin such as a polyvinyl formal and a polyvinyl butyral; a polyvinyl alcohol; and a phenoxy resin. The thermoplastic resin having an amide bond may be a polyamide, a polyimide, and a polyvinyl pyrrolidone. The thermoplastic resin having a sulfonyl group may be a polysulfone such as a polyethersulfone. Polyamides, polyimides, and polysulfones may have a functional group such as an ether bond or a carbonyl group in their main chain. Polyamides may have a substituent on the nitrogen atom of their amide group.

In particular, polyvinyl formal and polyethersulfone have good compatibility with the epoxy resins and therefore can be preferably used because they can be added while a phase-separated structure of [A] and [B] or [A'] and [B'] that has appropriate size is ensured. The commercial products of polyvinyl formal may include "Denka Formal (registered trademark)" (product of Denki Kagaku Kogyo Kabushiki Kaisha) and "VINYLEC (registered trademark)" (product of Chisso Corporation). The commercial products of polyethersulfone may include "SUMIKAEXCEL (registered trademark)" PES5200P, "SUMIKAEXCEL (registered trademark)" PES4700P, "SUMIKAEXCEL (registered trademark)" PES3600P, and "SUMIKAEXCEL (registered trademark)" PES5003P (products of Sumitomo Chemical Co., Ltd.).

The commercial product of the thermoplastic reins soluble in the epoxy resins and having a hydrogen-bonding functional group may include: polyvinyl acetal resins such as Denka Butyral, "Denka Formal (registered trademark)" (products of DENKI KAGAKU KOGYO KABUSHIKI KAISHA), and "VINYLEC (registered trademark)" (product of Chisso Corporation); phenoxy resins such as "UCAR (registered trademark)" PKHP (product of Union Carbide Corporation); polyamide resins such as "Macromelt (registered trademark)" (product of Henkel Hakusui Corporation) and "AMILAN (registered trademark)" CM4000 (product of TORAY INDUSTRIES INC.); polyimides such as "ULTEM (registered trademark)" (product of General Electric Company) and "Matrimid (registered trademark)" 5218 (product of Ciba); polysulfones such as "Victrex (registered trademark)" (product of Mitsui Chemicals, Inc.) and "UDEL (registered trademark)" (product of Union Carbide Corporation); and polyvinyl pyrrolidones such as "Luviskol (registered trademark)" (product of BASF Japan).

Acrylic resins have high compatibility with epoxy resins and are therefore preferably used to control viscoelasticity. The commercial products of the acrylic resins may include "DIANAL (registered trademark)" BR series (product of Mitsubishi Rayon Co., Ltd.) and MATSUMOTO MICROSPHERE (registered trademark)" M, M100, and M500 (products of Matsumoto Yushi-Seiyaku Co., Ltd.).

Cross-linked rubber particles and core-shell rubber particles prepared by graft polymerization of a heteropolymer on the surfaces of cross-linked rubber particles are preferably used as the rubber particles because of their handleability.

The commercial products of the cross-linked rubber particles that can be used may include FX501P (product of JSR Corporation) composed of a cross-linked product of a carboxyl-modified butadiene-acrylonitrile copolymer, CX-MN series (product of Nippon Shokubai Co., Ltd.) composed of acrylic rubber fine particles, and YR-500 series (product of Tohto Kasei Co., Ltd).

The commercial product of the core-shell rubber particles that can be used may include "PARALOID (registered trademark)" EXL-2655 (product of Kureha Corporation) composed of a butadiene-alkyl methacrylate-styrene copolymer, "STAPHYLOID (registered trademark)" AC-3355 and TR-2122 (products of Takeda Pharmaceutical Company Limited) composed of an acrylate-methacrylate copolymer, "PARALOID (registered trademark)" EXL-2611 and EXL-3387 (products of Rohm & Haas) composed of a butyl acrylate-methyl methacrylate copolymer, and "KANE ACE (registered trademark)" MX series (product of Kaneka Corporation).

Polyamide particles and polyimide particles are preferably used as the thermoplastic resin particles. The commercial product of the polyamide particles may include SP-500 (product of Toray Industries Inc.) and "Orgasol (registered trademark)" (product of ARKEMA).

In the present invention, the organic particles such as rubber particles and thermoplastic resin particles are added in an amount of preferably 0.1 to 30 parts by weight based on 100 parts by weight of all the epoxy resins and more preferably 1 to 15 parts by weight, so that the cured resin product to be obtained has well-balanced elastic modulus and toughness.

To prepare the epoxy resin composition of the present invention, any of a kneader, a planetary mixer, a triple roll mill, a twin screw extruder, and the like is preferably used. After the epoxy resin components are fed and kneaded, the temperature of the mixture of the epoxy resins is raised to an appropriate temperature between 130 to 180° C. under stirring to dissolve or disperse components other than the curing agent and curing catalyst in the mixture of the epoxy resins. Then the temperature is lowered to preferably 100° C. or less and more preferably 80° C. or less under stirring, and the curing agent and curing catalyst are added, kneaded, and dispersed. This method is used preferably because an epoxy resin composition excellent in storage stability can be obtained.

The epoxy resin composition of the present invention may be used as cured epoxy resin products obtained by curing the epoxy resin composition and also used for prepregs for fiber reinforced composite materials in which the cured epoxy resin products are used as matrices, cured products of the prepregs, reinforcing fiber complex materials formed of combinations of the cured epoxy resin products and reinforcing fiber materials, and the like.

A preferred embodiment of a cured product obtained by curing the epoxy resin composition of the present invention provides a cured epoxy resin product having a phase-separated structure that is formed of at least an [A]-rich phase and a [B]-rich phase or an [A']-rich phase and a [B']-rich phase and has a structure period of 0.01 to 5 μm. Another preferred embodiment of the cured product obtained by curing the epoxy resin composition of the present invention provides a cured epoxy resin product having a phase-separated structure that is formed of at least an [A']-rich phase and a [B']-rich phase and has a structure period of 0.01 to 5 μm. As described above, these phase-separated structures can provide cured epoxy resin products having both good elastic modulus and good toughness which are conventionally difficult to achieve at the same time.

When the epoxy resin composition of the present invention is used as the matrix resin of a prepreg, it is preferable, in terms of processability such as tackiness and drapability, that the viscosity of the epoxy resin composition at 80° C. be in the range of 0.1 to 200 Pa·s. The viscosity is more preferably in the range of 0.5 to 100 Pa·s and most preferably in the range of 1 to 50 Pa·s. When the viscosity at 80° C. is less than 0.1 Pa·s, the shape retainability of the prepreg may be insufficient, causing the occurrence of cracks. In addition, resin flows frequently occur during molding, and this may cause unevenness in the content of the reinforcing fibers. When the viscosity at 80° C. exceeds 200 Pa·s, streaks may be formed during a process of forming the epoxy resin composition into film, or unimpregnated portions may be formed during a process of impregnating the reinforcing fibers.

In particular, when the epoxy resin composition of the present invention is used for prepregs for aircraft primary structural materials, the minimum viscosities of the epoxy resin compositions are in the range of preferably 0.05 to 20 Pa·s and more preferably 0.1 to 10 Pa·s. When the minimum viscosity is less than 0.05 Pa·s, the shape retainability of the prepreg may be insufficient, causing the occurrence of cracks. In addition, resin flows frequently occur during molding, and this may cause unevenness in the content of the reinforcing fibers. When the minimum viscosity exceeds 20 Pa·s, streaks may be formed during a process of forming the epoxy resin composition into film, or unimpregnated portions may be formed during a process of impregnating the reinforcing fibers.

The viscosity indicated herein is a complex viscoelastic modulus η* that is measured using a dynamic viscoelastic modulus measuring apparatus (Rheometer RDA2, product of Rheometric Scientific). Specifically, the measurement is carried out by using parallel plates having a diameter of 40 mm under simple heating at a temperature rising rate of 2° C./min, a frequency of 0.5 Hz, and a Gap of 1 mm.

No particular limitation is imposed on the curing temperature and curing time used to obtain cured products of the epoxy resin composition of the present invention. The curing temperature and curing time may be appropriately selected according to the types of the curing agent and catalyst added and from the viewpoints of cost and productivity and also of the mechanical properties, thermal resistance, quality, and the like of the cured products to be obtained. For example, with a curing agent system formed of a combination of dicyandiamide and DCMU, it is preferable to perform curing at 135° C. for 2 hours. When diaminodiphenylsulfone is used, it is preferable to perform curing at 180° C. for 2 hours.

The measurement for the bending elastic modulus of a cured resin product is carried out using samples obtained as described below and a universal testing machine (product of Instron). The measurement is carried out by 3-point bending at a span of 32 mm and a crosshead speed of 2.5 mm/min according to JIS K7171 (1994), and the bending elastic modulus is obtained as the average of five samples (n=5). The samples for the measurement of the bending elastic modulus of the cured resin product are prepared as follows. An uncured epoxy resin composition is degassed in a vacuum and then cured under certain curing conditions in a mold with a 2 mm-thick Teflon (registered trademark) spacer that is provided so that the thickness of the cured resin product is set to 2 mm, and a plate-like cured product with no voids is thereby obtained. The cured product is cut into pieces of 10 mm wide and 60 mm long using a diamond cutter.

The measurement for the toughness of the cured resin product is carried out using samples obtained as described below and a universal testing machine (product of Instron). The measurement is carried out according to ASTM D5045 (1999). The toughness is obtained as the average of five samples (n=5). The samples for the measurement of the toughness of the cured resin product are produced as follows. An uncured epoxy resin composition is degassed in a vacuum and then cured under certain conditions in a mold with a 6 mm-thick Teflon (registered trademark) spacer that is provided so that the thickness of the cured resin product is set to 6 mm, and a plate-like cured product with no voids is thereby obtained. The cured product is cut into pieces of 12.7 mm wide and 150 mm long using a diamond cutter, and a prenotch of 5 to 7 mm is formed on one widthwise side of each of the cut pieces. The pre-notch is formed in advance in each test piece by placing the edge of a razor cooled to liquid nitrogen temperature on the test piece and applying an impact to the razor using a hammer.

No particular limitation is imposed on the reinforcing fibers used in the present invention. Any of glass fibers, carbon fibers, aramid fibers, boron fibers, alumina fibers, silicon carbide fibers, and the like may be used. A mixture of two or more types of the above fibers may be used. Among them, carbon fibers that can provide a light-weight and high-stiffness fiber reinforced composite material are preferably used. In particular, carbon fibers having a tensile elastic modulus of 100 to 900 GPa are preferred, and carbon fibers having a tensile elastic modulus of 200 to 800 GPa are more preferred.

When such high-elastic modulus carbon fibers and the epoxy resin composition of the present invention are used in combination, the effect of the present invention tends to be particularly striking.

No particular limitation is imposed on the form of the reinforcing fibers. For example, any of unidirectionally aligned long fibers, tows, woven fabrics, mats, knits, braids, and short chopped fibers having a length of less than 10 mm, and the like may be used. The above long fibers are single fibers or fiber bundles that continuously extend substantially 10 mm or more. The short fibers are fiber bundles cut into lengths of less than 10 mm. In particular, an arrangement in which reinforcing fiber bundles are unidirectionally aligned is most suitable for applications that require high specific strength and specific elastic modulus. An easy-to-handle cloth-like (fabric-like) arrangement is also suitable for the present invention.

The prepreg of the present invention is formed by impregnating a fiber base material with the epoxy resin composition of the present invention. The impregnation method may include: a wet method in which the fiber base material is impregnated with the epoxy resin composition that has been dissolved in a solvent such as methyl ethyl ketone or methanol to reduce its viscosity; and a hot-melt method (dry method) in which the fiber base material is impregnated with the epoxy resin composition that has been heated to reduce its viscosity.

In the wet method, the reinforcing fibers are immersed in the solution of the epoxy resin composition and then removed therefrom, and the solvent is evaporated using an oven or the like. In the hot-melt method, the reinforcing fibers are directly impregnated with the epoxy resin composition that has been heated to reduce its viscosity; alternatively, a film of release paper or the like coated with the epoxy resin composition is prepared in advance and then placed on one or both sides of the reinforcing fibers, and heat and pressure are applied to impregnate the reinforcing fibers with the resin. The hot-melt method is preferred because substantially no solvent remains in the prepreg.

Preferably, the prepreg contains the reinforcing fibers in an amount of 70 to 200 g/m$^2$. When the amount of the reinforcing fibers is less than 70 g/m$^2$, a larger number of prepreg sheets need to be laminated to obtain a certain thickness when a fiber reinforced composite material is molded, and therefore the operation may become complicated. When the amount of the reinforcing fibers exceeds 200 g/m$^2$, the prepreg tends to have poor drapability. The percent by weight of the fibers used is preferably 60 to 90% by weight and is generally in the range of 65 to 85% by weight. When the percent by weight of the fibers is less than 60% by weight, the advantages of the fiber-reinforced composite material excellent in specific strength and specific modulus may not be obtained because the ratio of the resins is too large. In addition, when a fiber reinforced composite material is molded, the amount of heat generated during curing may be excessively large. When the percent by weight of the fibers exceeds 90% by weight, the obtained composite material may have a large number of voids due to imperfect impregnation of the resins.

The composite material of the present invention is produced by, for example, after the prepreg and/or a laminate of prepreg sheets is formed, heat-curing the resins while pressure is applied to the formed prepreg and/or the laminate.

To apply heat and pressure, any of a press molding method, an autoclave molding method, a bag molding method, a wrapping tape method, an internal pressure molding method, and similar methods may be appropriately used.

In the autoclave molding method, prepreg sheets are laminated on a tool plate having a certain shape and covered with a bagging film. Then, while the laminate is degassed, pressure and heat are applied thereto to cure the resins. With this method, the fiber orientation can be precisely controlled, and less voids are formed. Therefore, a high-quality molded product having good mechanical properties can be obtained.

In the wrapping tape method, a prepreg is wound around a cored bar such as a mandrel and molded into a fiber reinforced composite material-made tubular body; thus, this method is suitable for producing rod-like bodies such as golf shafts and fishing rods. More specifically, in this method, the prepreg is wound around the mandrel, and a wrapping tape formed of a thermoplastic film is wound on the wound prepreg to secure the prepreg and apply pressure thereto, and the resins are heat-cured in an oven, and then the cored bar is pulled out, thus obtaining the tubular body.

In the internal pressure molding method, a preform produced by winding a prepreg around an internal pressure application body such as a thermoplastic resin-made tube is placed in a mold. Then, high-pressure gas is introduced into the internal pressure application body to apply pressure, and the mold is heated at the same time. This method is preferably used to mold products having complicated shapes such as golf shafts, bats, and tennis and badminton rackets.

The fiber reinforced composite material obtained using the cured product of the epoxy resin composition of the present invention as a matrix resin is preferably used in sports, general industrial, and aerospace applications. More specifically, the fiber reinforced composite material is preferably used in sports applications such as applications for golf shafts, fishing rods, tennis and badminton rackets, hockey and other sticks, and ski poles. Moreover, the fiber reinforced composite material is preferably used in general industrial applications such as structural materials for movable bodies (for example, automobiles, ships, and railroad cars), drive shafts, flat springs, windmill blades, pressure vessels, flywheels, rollers for paper-making, roof materials, cables, and repairing-reinforcing materials. In addition, the fiber reinforced composite material is preferably used in aerospace applications such as applications for aircraft primary materials (for example, main wings, tail assemblies, and floor beams), applications for secondary structural materials (for example, flaps, ailerons, cowls, fairings, and interior materials), and applications for structural materials for rocket motor cases and artificial satellites.

The fiber-reinforced composite material-made tubular body produced by curing the prepreg of the present invention into a tubular shape can be used preferably for golf shafts, fishing rods, and the like.

EXAMPLES

The present invention will now be described in more detail by way of Examples. Various physical properties were measured using the methods described below. These physical properties were measured in an environment at a temperature of 23° C. and a relative humidity of 50%, unless otherwise specified.

(1) Preparation of Epoxy Resin Compositions

Predetermined amounts of components other than a curing agent and a curing accelerator were fed to a kneader, and the mixture was heated to 160° C. while being kneaded. The mixture was kneaded at 160° C. for 1 hour, obtaining a clear viscous solution. The solution was cooled to 80° C. while being kneaded. Then, predetermined amounts of the curing agent and the curing accelerator were added, and the resultant mixture was kneaded, obtaining an epoxy resin composition. The ratio of the amounts of the raw materials used in each Example and Comparative Example are shown in Tables 1-1, 1-2, 2-1, and 2-2. The contents of [A], [B], [C], [D] and [E] and the contents of [A'], [B'], [C'], [D'], and [E'] in the obtained epoxy resin compositions are also shown in Tables 1-1, 1-2, 2-1, and 2-2. In each Table, EEW represents epoxy equivalent; the number of functional groups represents the average number of epoxy groups; Mn represents number average molecular weight; and SP represents a solubility parameter.

The epoxy equivalent, the average number of epoxy groups, and the like of each of the raw materials used to prepare each epoxy resin composition are shown below.

<Diglycidyl Ether-Type Epoxy Resin>

Bisphenol F-type epoxy resin ("EPICLON (registered trademark)" Epc830, epoxy equivalent: 170, bifunctional, product of DIC Corporation)

Bisphenol A-type epoxy resin ("jER (registered trademark)" 828, epoxy equivalent: 189, bifunctional, product of Japan Epoxy resin Co., Ltd.)

Bisphenol A-type epoxy resin ("jER (registered trademark)" 834, epoxy equivalent: 250, bifunctional, product of Japan Epoxy resin Co., Ltd.)

Bisphenol F-type epoxy resin ("EPOTOHTO (registered trademark)" YDF2001, epoxy equivalent: 475, bifunctional, product of Tohto Kasei Co., Ltd.)

Bisphenol F-type epoxy resin ("jER (registered trademark)" 4004P, epoxy equivalent: 880, bifunctional, product of Japan Epoxy resin Co., Ltd.)

Bisphenol A-type epoxy resin ("jER (registered trademark)" 1007, epoxy equivalent: 1,975, bifunctional, product of Japan Epoxy resin Co., Ltd.)

Bisphenol F-type epoxy resin ("jER (registered trademark)" 4007P, epoxy equivalent: 2,270, bifunctional, product of Japan Epoxy resin Co., Ltd.)

Bisphenol A-type epoxy resin ("jER (registered trademark)" 1009, epoxy equivalent: 2,850, bifunctional, product of Japan Epoxy resin Co., Ltd.)

<Other Epoxy Resins>

Triglycidyl-m-aminophenol ("Sumi-Epoxy (registered trademark)" ELM120, epoxy equivalent: 118, trifunctional, product of Sumitomo Chemical Co., Ltd.)

Triglycidyl-p-aminophenol ("Araldite (registered trademark)" MY0510, epoxy equivalent: 101, trifunctional, product of Huntsman Advanced Materials)

Tetraglycidyl diaminodiphenylmethane ("Sumi-Epoxy (registered trademark)" ELM434, epoxy equivalent: 120, tetrafunctional, product of Sumitomo Chemical Co., Ltd.)

Modified TEPIC (epoxy equivalent:349, functionality: 2.6)

Modified TEPIC was obtained by dissolving 100 parts by weight of TEPIC-P (triglycidyl isocyanurate, epoxy equivalent: 106, trifunctional, product of Nissan Chemical Industries, Ltd.) in 3,000 parts by weight of toluene, adding 16 parts by weight of propionic anhydride, stirring the mixture at 120° C. to complete the reaction, and removing toluene.

Phenol novolac-type epoxy resin ("jER (registered trademark)" 154, epoxy equivalent: 178, functionality: 6.5, product of Japan Epoxy resin Co., Ltd.)

Triphenolmethane-type epoxy resin (TMH574, epoxy equivalent: 214, trifunctional, product of Sumitomo Chemical Co., Ltd.)

Triglycidyl isocyanurate (TEPIC-P, epoxy equivalent: 106, trifunctional, product of Nissan Chemical Industries, Ltd.)

<Curing Agents>

Dicyandiamide (curing agent, DICY-7, product of Japan Epoxy resin Co., Ltd.)

4,4'-DDS (curing agent, 4,4'-diaminodiphenylsulfone, Sumicure S, product of Sumitomo Chemical Co., Ltd.)

3,3'-DDS (curing agent, 3,3'-diaminodiphenylsulfone, product of Mitsui Fine Chemicals, Inc.)

<Additional Components>

"VINYLEC (registered trademark)" K (polyvinyl formal, product of Chisso Corporation)

DCMU99 (3-(3,4-dichlorophenyl)-1,1-dimethylurea, curing accelerator, product of Hodogaya Chemical Co., LTD.)

PES (polyethersulfone "SUMIKAEXCEL (registered trademark)" PES5003P (product of Sumitomo Chemical Co., Ltd.)

(2) Measurement of Molecular Weight

An epoxy resin was dissolved in THF at a concentration of 0.1 mg/mL, and the relative molecular weight of the epoxy resin was measured using HLC-8220GPC (product of Tosoh Corporation). UV-8000 (254 nm) was used as a detector, and a polystyrene standard sample was used. TSK-G4000H (product of Tosoh Corporation) was used as a column, and the measurement was performed at a flow rate of 1.0 mL/min and a temperature of 40° C. The weight ratio of the molecular weight of the epoxy resin contained was computed from the obtained area ratio.

(3) Computation of SP Value of Structural Unit in Each Epoxy Resin Raw Material

The SP value of the structural unit in the assumed cured product of each epoxy resin raw material was computed from a molecular structure using a method by Fedors described in Polym. Eng. Sci., 14(2), 147-154 (1974). The unit of the SP value computed is $(cal/cm^3)^{1/2}$.

(4) Measurement of Viscosity of Each Epoxy Resin Composition

The viscosity of each epoxy resin composition was measured using a dynamic viscoelastic modulus measuring apparatus (Rheometer RDA2, product of Rheometric Scientific). Specifically, the measurement was carried out by using parallel plates having a diameter of 40 mm under simple heating at a temperature rising rate of 2° C./rain, a frequency of 0.5 Hz, and a Gap of 1 mm to determine the minimum value of the complex viscosity.

(5) Bending Elastic Modulus of Cured Epoxy Resin Product

An uncured epoxy resin composition was degassed in a vacuum and then cured at a temperature of 135° C. for 2 hours (these conditions were used unless otherwise specified) in a mold that was set so that the thickness was to be 2 mm by means of a 2 mm-thick spacer made of Teflon (registered trademark). A cured resin product having a thickness of 2 mm was thereby obtained. The cured resin product was cut into test pieces of 10 mm wide and 60 mm long. An Instron universal testing machine (product of Instron) was used to carry out 3-point bending at a span of 32 mm and a crosshead speed of 2.5 mm/min according to JIS K7171 (1994), and elastic modulus was thereby obtained. The number of samples measured was 5 (n=5), and the average value was used for a comparison.

(6) Measurement of Toughness ($K_{IC}$) of Cured Epoxy Resin Product

An uncured epoxy resin composition was degassed in a vacuum and then cured at a temperature of 135° C. for 2 hours (these conditions were used unless otherwise specified) in a mold that was set so that the thickness was to be 6 mm by means of a 6 mm-thick spacer made of Teflon (registered trademark). A cured resin product having a thickness of 6 mm was thereby obtained. The cured resin product was cut into test pieces of 12.7×150 mm. The test pieces were subjected to a working experiment using an Instron universal testing machine (product of Instron) according to ASTM D5045 (1999). A pre-notch was given in advance in each test piece by placing the edge of a razor cooled to liquid nitrogen temperature on the test piece and applying an impact to the razor using a hammer. The toughness of the cured resin product refers to critical stress intensity under mode I deformation (opening mode).

(7) Measurement of Structure Period

The cured resin product obtained in (6) above was stained and sliced, and a transmission electron image was taken in a transmission electron microscope (TEM) under the following conditions. One of $OsO_4$ and $RuO_4$ was used as the stain according to the resin composition so that sufficient contrast was given to the morphology.

Apparatus: transmission electron microscope H-7100 (product of Hitachi, Ltd.)
Acceleration voltage: 100 kV
Magnification: 10,000×

The structure period of the [A]-rich phase and the [B]-rich phase was observed in the manner described above. The phase-separated structure of the cured product varies to form a continuous two-phase structure or a sea-island structure depending on the types of [A] and [B] and the ratio therebetween. Therefore, the structure period was measured for each structure as follows. In Tables 1-1 to 2-2, the phase structure period of a cured resin product is shown in the column of phase structure size (μm).

For the continuous two-phase structure, lines having a certain length were drawn on a microscope photograph, and intersections of the lines and the phase boundaries were extracted. Then the distances between adjacent intersections were measured, and the number average of the distances was used as the structure period. The above certain length was set on the basis of a microscope photograph as follows. When the structure period was expected to be of the order of 0.01 μm (0.01 μm or more and less than 0.1 μm), a photograph was taken at a magnification of 20,000×, and three 20 mm-long lines on the photograph (1 μm-long lines on the sample) were randomly selected. In the same manner, when the structure period was expected to be of the order of 0.1 μm (0.1 μm or more and less than 1 μm), a photograph was taken at a magnification of 2,000×, and three 20 mm-long lines on the photograph (10 μm-long lines on the sample) were randomly selected. When the structure period was expected to be of the order of 1 μm (1 μm or more and less than 10 μm), a photograph was taken at a magnification of 200×, and three 20 mm-long lines on the photograph (100 μm-long lines on the sample) were randomly selected. If the phase-separated structure period measured was out of the expected order, the lengths were re-measured at a magnification suitable for the order of the actual structure period, and this was employed.

For the sea-island structure, the structure period was the number average of the distances between islands of one phase that were present in a certain region in a microscope photograph. When the island phase had ellipsoidal or irregular shapes or circular or ellipsoidal shapes formed of two or more layers, the minimum distances between islands of one phase were used. The certain regions were set on the basis of a microscope photograph as follows. When the distance of the phase-separated structure period was expected to be of the order of 0.01 μm (0.01 μm or more and less than 0.1 μm), a photograph was taken at a magnification of 20,000×, and three 4 mm-square regions on the photograph (0.2 μm-square regions on the sample) were randomly selected. In the same manner, when the distance of the phase-separated structure period was expected to be of the order of 0.1 μm (0.1 μm or more and less than 1 μm), a photograph was taken at a magnification of 2,000×, and three 4 mm-square regions on the photograph (2 μm-square regions on the sample) were randomly selected. When the phase-separated structure period was expected to be of the order of 1 μm (1 μm or more and less than 10 μm), a photograph was taken at a magnification of 200×, and three 4 mm-square regions on the photograph (20 μm-square regions on the sample) were randomly selected. If the phase-separated structure period measured was out of the expected order, the measurement on the certain regions was again performed at a magnification suitable for the order of the actual structure period, and those were employed.

Alternatively, for the sea-island structure, the major axes of all the island phases in a certain region were measured, and the number average of the major axes was determined and used as the diameter of the island phase. When the islands of one phase had ellipsoidal or irregular shapes or were circles or ellipsoids formed of two or more layers, the diameters of the outermost circles or the major axes of the outermost ellipsoids were used. The certain regions were set on the basis of a microscope photograph as follows. When the phase-separated structure period was expected to be of the order of 0.01 μm (0.01 μm or more and less than 0.1 μm), a photograph was taken at a magnification of 20,000×, and three 4 mm-square regions on the photograph (0.2 μm-square regions on the sample) were randomly selected. In the same manner, when the phase-separated structure period was expected to be of the order of 0.1 μm (0.1 μm or more and less than 1 μm), a photograph was taken at a magnification of 2,000×, and three 4 mm-square regions on the photograph (2 μm-square regions on the sample) were randomly selected. When the phase-separated structure period was expected to be of the order of 1 μm (1 μm or more and less than 10 μm), a photograph was taken at a magnification of 200×, and three 4 mm-square regions on the photograph (20 μm-square regions on the sample) were randomly selected. If the phase-separated structure period measured was not of the expected order, the measurement on the certain regions was again performed at a magnification suitable for the order of the actual structure period, and the results obtained were used.

(8) Charpy Impact Test of Composite Material-Made Tubular Body

The test was performed for Examples 1 to 13 and Comparative Examples 1 to 12 in the following procedures.

<Production of Prepreg>

The epoxy resin composition produced according to (1) described above was applied onto a release paper sheet using a reverse roll coater, producing a resin film. Next, two sheets of the resin film were placed on opposite sides of carbon fibers "Torayca (registered trademark)" T800HB-12K (product of Toray Industries Inc., tensile elastic modulus: 294 GPa, tensile strength: 5,490 MPa) unidirectionally aligned in a sheet form. Pressure and heat were applied to the obtained laminate to impregnate it with the resin composition. A unidirectional prepreg having a carbon fiber weight of 125 g/m² per unit area and containing the fibers in an content ratio of 75% was thereby produced using T800HB.

In addition, a unidirectional prepreg was produced using the same procedure as above except that carbon fibers Torayca M40SC-12K (product of Toray Industries Inc., tensile elastic modulus: 380 GPa, tensile strength: 4,900 MPa) were used as reinforcing fibers—the prepreg produced using M40SC had a carbon fiber weight of 125 g/m² per unit area and contained the fibers in an content ratio 75%.

<Production of Composite Material-Made Tubular Body for Charpy Impact Test>

A composite material-made tubular body was produced according to the following steps (a) to (e): Sheets of the unidirectional prepreg produced using M40SC were laminated such that their fiber directions were inclined 45° and −45° with respect to the axial direction of a cylinder, and the laminate was wound 3 turns, and a sheet of the unidirectional prepreg produced using T800H was wound 3 turn such that the fiber direction was parallel to the axial direction of the cylinder, thereby producing the composite material-made tubular body having an inner diameter of 6.3 mm. A stainless steel-made round bar having a diameter of 6.3 mm and a length of 1,000 mm was used as a mandrel.

(a) Two rectangular sheets of 68 mm (length)×800 mm (width) were cut from the unidirectional prepreg produced using M40SC according to (8) described above such that the direction of the fiber axis was inclined 45 degrees with respect to the direction of the long side. These two prepreg sheets were laminated such that their fiber directions crossed each other and that the sheets were displaced 16 mm (one half of the circumferential length of the mandrel) in the short side direction.

(b) The laminate of the prepreg sheets was wound around the mandrel subjected to releasing treatment such that the long side of the rectangular prepreg sheets was oriented in the same direction as the axis of the mandrel.

(c) A rectangular sheet of 80 mm (length)×800 mm (width) was cut from the unidirectional prepreg produced using T800HB according to (8) described above (the long side direction of the sheet was the same as the axial direction of the fibers). On the mandrel obtained in (b), the cut rectangular sheet was wound around the mandrel such that the fiber direction was the same as the axial direction of the mandrel.

(d) A wrapping tape (thermal resistant film tape) was wound around the mandrel to cover the previously wound sheets, and the wound sheets were heat-molded in a curing furnace at 130° C. for 90 minutes (these conditions were used unless otherwise specified). The width of the wrapping tape was 15 mm, and the tension was 3.0 kg. The winding pitch (the displacement during winding) was 1.0 mm, and two layers of the wrapping tape were wrapped.

(e) After that, the mandrel was pulled out, and the wrapping tape was removed, whereby a composite material-made tubular body was obtained.

<Charpy Impact Test of Composite Material-Made Tubular Body>

The composite material-made tubular body for a Charpy impact test obtained as above was cut into 60 mm-long pieces, and test pieces having an inner diameter of 6.3 mm and a length of 60 mm were thereby produced. The Charpy impact test was performed by applying an impact (capacity: 29.4 N·m) to a side of the tubular body. Absorbed impact energy was calculated from the angle of rise using to the following equation:

$$E = WR[(\cos\beta - \cos\alpha) - \cos\alpha' - \cos\alpha)(\alpha+\beta)/(\alpha+\alpha')]$$

E: absorbed energy (J),
WR: moment about the rotation axis of a hammer (N·m),
α: angle of fall (°) of the hammer,
α': angle of rise (°) of the hammer when the hammer at angel of fall α is allowed to swing without a test piece,
β: angle of rise (°) of the hammer after the test piece is ruptured.

No notch was formed in the test pieces. The number of measurements n was 5 (n=5), and the average value was used for a comparison.

(9) Compression Strength after Impact of Fiber Reinforced Composite Material and Compression Strength Test of Holed Plate Under Hot-Humid Environment The test was performed for Examples 7, and 10 to 13 and Comparative Examples 9 to 12 using the following procedures.

<Production of Prepreg>

The epoxy resin composition produced in (1) described above was applied onto a release paper sheet using a knife coater, producing a resin film. Next, two sheets of the resin film were placed on opposite sides of carbon fibers "Torayca (registered trademark)" T800G-24K-31E (product of Toray Industries Inc., the number of fibers: 24,000, tensile strength: 5.9 GPa, tensile elastic modulus: 290 GPa, tensile ductility: 2.0%) unidirectionally aligned in a sheet form. Pressure and heat were applied to impregnate the carbon fibers with the resins, and a unidirectional prepreg having a basis weight of carbon fibers of 190 g/m² and containing a matrix resin in an amount of 35.5% by weight was thereby produced.

<Production of Fiber Reinforced Composite Material and Compression Strength after Impact>

Twenty four sheets of the prepreg produced in (8) described above were quasi-isotropically laminated in a (+45°/0°/−45°/90°) 3 s sequence and were molded in an autoclave at a temperature of 180° C., a pressure of 0.59 MPa, and a temperature rising rate of 1.5° C./min for two hours, producing a laminate. A sample of 150 mm (length)×100 mm (width) was cut from the laminate, and a drop weight impact of 6.7 J/mm was applied to the central portion of the sample according to SACMA SRM 2R-94 to determine compression strength after impact.

<Production of Fiber Reinforced Composite Material and Compression Strength of Holed Plate Under Hot-Humid Environment>

Sixteen sheets of the prepreg produced in (8) described above were quasi-isotropically laminated in a (+45°/0°/−45° C./90° C.) 2 s sequence and were molded in an autoclave at a temperature of 180° C., a pressure of 0.59 MPa, and a temperature rising rate of 1.5° C./min for two hours, producing a laminate. A sample of 305 mm (length)×25.4 mm (width) was cut from the laminate, and a hole having a diameter of 6.35 mm was formed in the central portion thereof to form a holed plate. The holed plate was immersed in hot water at a temperature of 72° C. for two weeks, and its compression strength was determined under the atmosphere at a temperature of 82° C. according to SACMA SRM 3R-94.

For each of the Examples and Comparative Examples, an epoxy resin composition, a prepreg, and a tubular body of a fiber reinforced composite material were produced using the above methods. The results of their characteristics measurement are summarized in Tables 1-1 to 2-2. The molecular weights of the bisphenol-type epoxy resins used in the Examples and Comparative Examples were determined separately in advance. In each of Examples 1 to 6, 8, and 9, and Comparative Examples 1 to 8, the amount of a diglycidyl ether-type epoxy resin having a molecular weight of 500 to 1,200 to be contained and the amount of a diglycidyl ether-type epoxy resin having a molecular weight of 1,500 or more to be contained were obtained in advance, and the amounts of the diglycidyl ether-type epoxy resins to be added were determined so as to give the molecular weight ratio according to the present invention. In each of Example 7 and 10 to 13 and Comparative Examples 9 to 12, the amount of a diglycidyl ether-type epoxy resin having a molecular weight of 300 to 1,200 to be contained and the amount of a diglycidyl ether-type epoxy resin having a molecular weight of 1,500 to 5,000 to be contained were obtained in advance, and the amounts of the diglycidyl ether-type epoxy resins to be added were determined so as to give the molecular weight ratio according to the present invention. In Examples 7 and 10 to 13 and Comparative Examples 9 to 12, the curing temperature of the epoxy resin composition or prepreg used for the measurements of (5) bending elastic modulus of a cured resin product and (6) toughness ($K_{IC}$) of a cured resin product was changed from 135° C. to 180° C.

Example 1

As shown in Table 1-1, when jER1007 containing [A] as a main component was used, ELM120 was used as [B], and jER834 containing [C] as a main component was used, the phase-separated structure period was small, and the mechanical properties of the tubular body were good.

Example 2

A thermosetting resin composition was prepared using the same procedure as in Example 1 except that jER1009 (containing [A] as a main component) instead of jER1007 was used, that the mixing ratio shown in Table 1-1 was used, and that the amount of [A] was set to a value near the upper limit of the specified range. The resin elastic modulus was slightly lower than that in Example 1. Therefore, the mechanical properties of the tubular body were slightly lowered but were at acceptable levels.

Example 3

A thermosetting resin composition was prepared using the same procedure as in Example 2 except that jER154 was added as another epoxy resin, that the mixing ratio shown in Table 1-1 was used, and that the amount of [E] was set to a value near the upper limit of the specified range. The resin elastic modulus was improved as compared with that in Example 2, but the toughness was lowered. Therefore, the mechanical properties of the tubular body were at the same levels as those in Example 2.

Example 4

A thermosetting resin composition was prepared using the same procedure as in Example 1 except that jER4004P (containing [A] as a main component) instead of jER1007 and YDF2001 (containing [C] as a main component) instead of jER834 were used, that the mixing ratio shown in Table 1-1 was used, and that the amount of [C] was set to a value near the lower limit of the specified range. The phase-separated structure period was greater than that in Example 1. Therefore, the mechanical properties of the tubular body were slightly lowered but were at acceptable levels.

Example 5

A thermosetting resin composition was prepared using the same procedure as in Example 4 except that a part of ELM120 was replaced with YDF2001, that the mixing ratio shown in Table 1-1 was used, and that the amount of [C] was set to a value near the upper limit of the specified range. The phase-separated structure period was much smaller than that in Example 3. Therefore, the mechanical properties of the tubular body were significantly improved.

Example 6

A thermosetting resin composition was prepared using the same procedure as in Example 4 except that jER4007P was used instead of jER14004P, that ELM434 was used as [B], that jER828 was used as another component, that the mixing ratio shown in Table 1-1 was used, and that the difference in SP value between [A] and [B] was set to a value of 1.9 that is close to the lower limit in the specified range. The resin elastic modulus was lower than that in Example 5, and the mechanical properties of the tubular body were slightly lowered but at sufficient levels.

Example 7

A thermosetting resin composition was prepared using the same procedure as in Example 5 except that 4,4'-DDS instead of DICY-7 was used as [D], that DCMU99 was omitted, that the mixing ratio shown in Table 1 was used, and that the curing temperature of the epoxy resins or the prepreg in the measurements of (3) bending elastic modulus of the cured resin product and (4) toughness (KIC) of the cured resin product, (7) production of the composite material-made tubular body for Charpy impact test, and the like was set to 180° C. The phase-separated structure period was greater than that in Example 5, and therefore the resin toughness was lowered. Therefore, the mechanical properties of the tubular body were reduced but at acceptable levels. Among the mechanical properties of a flat plate of the fiber reinforced composite material, the compression strength after impact important for aircraft primary structural materials was very high, and the compression strength of a holed plate under a hot-humid environment was at an acceptable level.

Example 8

As shown in Table 1-2, modified TEPIC was used as [B], DICY-7 was used as [D], and the difference in SP value between [A] and [B] was set to a higher value of 5.3. Therefore, the size of the phase-separated structure was as large as 4 μm, but the mechanical properties of the tubular body were at permissible levels.

Example 9

Since the contents and the like of [A], [B], and [C] were set within optimal regions, a fine phase-separated structure was obtained. The toughness was very high (1.8), and the mechanical properties of the tubular body were very good.

Example 10

3,3'-DDS was used as the curing agent, and a combination of jER828 and jER1007 was used as a diglycidyl ether-type epoxy resin. As a result, the size of the phase-separated structure was slightly large (3 µm). However, the mechanical properties of a flat plate of the fiber reinforced composite material were relatively good.

Example 11

Since jER1007 in Example 10 was replaced with jER4004P, an appropriate phase-separated structure was obtained. Further, the mechanical properties of a flat plate of the fiber reinforced composite material were good.

Example 12

3,3'-DDS was used as the curing agent. In addition, the contents of [A'] and [B'] were set to values close to the lower limits, and the content of [C'] was set to a value close to the upper limit. As a result, a very fine phase-separated structure was formed. The toughness was at a permissible level of 1.1, and the mechanical properties of a flat plate of the fiber reinforced composite material were at acceptable levels.

Example 13

3,3'-DDS was used as the curing agent, and the contents and the like of [A'], [B'], and [C'] were set within optimal ranges. As a result, a fine phase-separated structure was obtained, and the toughness was very high (1.4). The mechanical properties of the flat plate of a fiber reinforced composite material were very good.

Comparative Example 1

A thermosetting resin composition was prepared using the same procedure as in Example 1 except that only 100 parts by weight of [B] (ELM120) was used as the epoxy resins, as shown in Table 2-1. The cured resin product was homogeneous without phase separation. Although the resin elastic modulus was very high, the resin toughness was low. Therefore, the mechanical properties of the tubular body were significantly reduced and were insufficient.

Comparative Example 2

A thermosetting resin composition was prepared using the same procedure as in Example 2 except that an epoxy resin containing [C] as a main component was not used and that the content ratio of [A] and [B] was changed. The phase-separated structure period was large, and the resin toughness was significantly reduced. Therefore, the mechanical properties of the tubular body were significantly reduced and were insufficient.

Comparative Example 3

A thermosetting resin composition was prepared using the same procedure as in Example 2 except that the amount of jER834 was 50 parts by weight, that each of the amounts of jER1009 and ELM120 was 25 parts by weight, and that the amount of [C] was set to a value higher than the specified range. The cured resin product was homogeneous without phase separation, and the resin toughness was significantly reduced. Therefore, the mechanical properties of the tubular body were significantly reduced and were insufficient.

Comparative Example 4

A thermosetting resin composition was prepared using the same procedure as in Example 2 except that 10 parts by weight of jER1009 and 70 parts by weight of ELM120 were used and that the amount of [B] was set to a value greater than the specified range. The cured resin product was not phase-separated and was homogeneous, and the resin toughness was significantly reduced. Therefore, the mechanical properties of the tubular body were significantly reduced and were insufficient.

Comparative Example 5

A thermosetting resin composition was prepared using the same procedure as in Example 1 except that ELM120 was not added but 40 parts by weight of jER828 was added and that the amount of [B] was set to a value less than the specified range. The cured resin product was not phase-separated and was homogeneous, and the resin elastic modulus and resin toughness were reduced, and then the mechanical properties of the tubular body were insufficient.

Comparative Example 6

As shown in Table 2-2, jER4004P was used as [A] and TMH574 that gave the difference in SP value of 1.0 (lower than the lower limit in the specified range (1.5)) was used instead of [B]. As a result, the cured resin product was not phase-separated and was homogeneous, and the resin toughness was significantly reduced, and then the mechanical properties of the tubular body were insufficient.

Comparative Example 7

A combination of jER828 and jER4004P was used as a diglycidyl ether-type epoxy resin, and the amount of [C] was set to a value less than the specified range. As a result, the cured resin product was not phase-separated and was homogeneous, and the resin elastic modulus and resin toughness were significantly reduced, and then, the mechanical properties of the tubular body were insufficient.

Comparative Example 8

A combination of jER828 and jER1009 was used as a diglycidyl ether-type epoxy resin, and the amount of [C] was set to a value of 4 parts by weight, which is outside the appropriate range. As a result, the cured resin product was not phase-separated and was homogeneous, and the resin elastic modulus and resin toughness o were significantly reduced, and then the mechanical properties of the tubular body were insufficient.

Comparative Example 9

3,3'-DDS was used as the curing agent, and jER4004P was used as [A]. In this case, TEPIC-P that gave the difference in SP value of 8.3 (greater than the upper limit (6.5) in the specified range) was used instead of [B]. As a result, the phase-separated structure period was large, and the resin toughness was reduced, and then the compression strength after impact of a flat plate of the fiber reinforced composite material was highly insufficient.

Comparative Example 10 jER1007 in Example 10 was replaced with jER1007. As a result, the cured resin product was not phase-separated and was homogeneous, and the resin toughness was significantly reduced, and then the compression strength after impact of a flat plate of the fiber reinforced composite material was highly insufficient.

Comparative Example 11

A resin composition was prepared using the same procedure as in Example 1 in Patent Document 1 except that polyethersulfone was not used. As a result, the cured resin product was not phase-separated and was homogeneous, and the resin toughness was significantly reduced, and then the compression strength after impact of a flat plate of the fiber reinforced composite material was highly insufficient.

Comparative Example 12

A resin composition was prepared using the resin composition ratio equivalent to that in Example 1 in Patent Document 1. As a result, the minimum viscosity was much greater than the appropriate range, and a large number of voids ware formed in the molded product; therefore, the compression strength after impact of a flat plate of the fiber reinforced composite material and the compression strength of the holed plate in a hot-humid environment were insufficient.

TABLE 1-1

| | Material for epoxy resin composition | EEW | Number of functional group | Mn | SP | Example 1 | Example 2 | Example 3 | Example 4 | Example 5 | Example 6 | Example 7 |
|---|---|---|---|---|---|---|---|---|---|---|---|---|
| Diglycidyl ether-type epoxy resin | Epc830 | 170 | 2 | 340 | 13.5 | | | | | | | |
| | jER828 | 189 | 2 | 378 | 12.8 | | | | | | 10 | |
| | jER834 | 250 | 2 | 500 | 12.7 | 20 | 20 | 20 | | | | |
| | YDF2001 | 475 | 2 | 950 | 13.2 | | | | 10 | 30 | 25 | 30 |
| | jER4004P | 880 | 2 | 1760 | 13.0 | | | | 40 | 40 | | 40 |
| | jER1007 | 1975 | 2 | 3950 | 12.2 | 40 | | | | | | |
| | jER4007P | 2270 | 2 | 4540 | 13.0 | | | | | | 30 | |
| | jER1009 | 2850 | 2 | 5700 | 12.2 | | 60 | 30 | | | | |
| Other epoxy resin | ELM120 | 118 | 3 | 354 | 15.3 | 40 | 20 | 40 | 50 | 30 | | 30 |
| | MY0510 | 101 | 3 | 303 | 15.3 | | | | | | | |
| | ELM434 | 120 | 4 | 480 | 14.9 | | | | | | 35 | |
| | Modified TEPIC | 349 | 2.6 | 907 | 18.3 | | | | | | | |
| | jER154 | 178 | 6.5 | 1157 | | | | | 10 | | | |
| | TMH574 | 214 | 3 | 642 | 14.0 | | | | | | | |
| | TEPIC-P | 106 | 3 | 318 | 21.3 | | | | | | | |
| [D] or [D'] Curing agent | DICY-7 | | | | | 5 | 5 | 5 | 5 | 5 | 5 | |
| | 4,4'-DDS | | | | | | | | | | | 30 |
| | 3,3'-DDS | | | | | | | | | | | |
| Other components | Vinylec K | | | | | 3 | 3 | 3 | 3 | 3 | 3 | 3 |
| | PES | | | | | | | | | | | |
| | DCMU99 | | | | | 3 | 3 | 3 | 3 | 3 | 3 | |
| Balance of SP values between[A] and [B] or [A'] and [B'] | | | | | | 3.1 | 3.1 | 3.1 | 2.3 | 2.3 | 1.9 | 2.3 |
| Content of [A] (parts by weight) | | | | | | 35 | 55 | 25 | 35 | 32 | 33 | 32 |
| Content of [A'] (parts by weight) | | | | | | 26 | 19 | 9 | 30 | 28 | 24 | 28 |
| Content of [B] ([B']) (parts by weight) | | | | | | 40 | 20 | 40 | 50 | 30 | 35 | 30 |
| Content of [C] (parts by weight) | | | | | | 18 | 20 | 20 | 15 | 35 | 27 | 35 |
| Content of [C'] (parts by weight) | | | | | | 23 | 24 | 25 | 15 | 36 | 32 | 37 |
| Content of [E] (parts by weight) | | | | | | 7 | 5 | 15 | 0 | 3 | 5 | 3 |
| Content of [E'] (parts by weight) | | | | | | 11 | 37 | 26 | 5 | 6 | 9 | 5 |
| Minimum viscosity of epoxy resin composition (Pa·s) | | | | | | — | — | — | — | — | — | 0.82 |
| Properties of cured product | Bending elastic modulus (GPa) | | | | | 4.2 | 4.0 | 4.5 | 4.8 | 4.6 | 4.5 | 4.5 |
| | Toughness (MPa·m$^{0.5}$) | | | | | 1.4 | 1.6 | 1.5 | 1.3 | 1.8 | 1.5 | 1.5 |
| | Phase structure size (μm) | | | | | 0.3 | 0.5 | 0.4 | 1.5 | 0.1 | 0.2 | 1.2 |
| | Diameter of island phase (μm) | | | | | 0.1 | 0.4 | 0.1 | 0.4 | — | 0.08 | 0.3 |
| Properties of composite | Value of Charpy impact (J) | | | | | 11.9 | 11.4 | 11.3 | 11.5 | 12.9 | 12.2 | 11.3 |
| | Compression strength after impact (MPa) | | | | | — | — | — | — | — | — | 254 |
| | Compression strength of holed plate under hot-humid environment (MPa) | | | | | — | — | — | — | — | — | 251 |

TABLE 1-2

| Material for epoxy resin composition | | EEW | Number of functional group | Mn | SP | Example 8 | Example 9 | Example 10 | Example 11 | Example 12 | Example 13 |
|---|---|---|---|---|---|---|---|---|---|---|---|
| Diglycidyl ether-type epoxy resin | Epc830 | 170 | 2 | 340 | 13.5 | | | | | | |
| | jER828 | 189 | 2 | 378 | 12.8 | | | 30 | 30 | | |
| | jER834 | 250 | 2 | 500 | 12.7 | 20 | | | | 40 | |
| | YDF2001 | 475 | 2 | 950 | 13.2 | | 30 | | | | 30 |
| | jER4004P | 880 | 2 | 1760 | 13.0 | 40 | | | 30 | | |
| | jER1007 | 1975 | 2 | 3950 | 12.2 | | | 30 | | 30 | 30 |
| | jER4007P | 2270 | 2 | 4540 | 13.0 | | 35 | | | | |
| | jER1009 | 2850 | 2 | 5700 | 12.2 | | | | | | |
| Other epoxy resin | ELM120 | 118 | 3 | 354 | 15.3 | | 35 | 40 | 40 | 20 | 40 |
| | MY0510 | 101 | 3 | 303 | 15.3 | | | | | | |
| | ELM434 | 120 | 4 | 480 | 14.9 | | | | | | |
| | Modified TEPIC | 349 | 2.6 | 907 | 18.3 | 40 | | | | | |
| | jER154 | 178 | 6.5 | 1157 | | | | | | 10 | |
| | TMH574 | 214 | 3 | 642 | 14.0 | | | | | | |
| | TEPIC-P | 106 | 3 | 318 | 21.3 | | | | | | |
| [D] or [D'] Curing agent | DICY-7 | | | | | 5 | 5 | | | | |
| | 4,4'-DDS | | | | | | | | | | |
| | 3,3'-DDS | | | | | | | 30 | 30 | 30 | 30 |
| Other components | Vinylec K | | | | | | | | | | |
| | PES | | | | | | | | | | |
| | DCMU99 | | | | | 3 | 3 | | | | |
| Balance of SP values between [A] and [B] or [A'] and [B'] | | | | | | 5.3 | 2.3 | 3.1 | 2.3 | 3.1 | 3.1 |
| Content of [A] (parts by weight) | | | | | | 38 | 29 | 26 | 28 | 28 | 26 |
| Content of [A'] (parts by weight) | | | | | | 33 | 22 | 20 | 24 | 22 | 21 |
| Content of [B] ([B']) (parts by weight) | | | | | | 40 | 35 | 40 | 40 | 20 | 40 |
| Content of [C] (parts by weight) | | | | | | 17 | 31 | 5 | 5 | 36 | 29 |
| Content of [C'] (parts by weight) | | | | | | 22 | 33 | 32 | 30 | 39 | 31 |
| Content of [E] (parts by weight) | | | | | | 5 | 5 | 29 | 27 | 16 | 5 |
| Content of [E'] (parts by weight) | | | | | | 5 | 10 | 8 | 6 | 19 | 8 |
| Minimum viscosity of epoxy resin composition (Pa·s) | | | | | | — | — | 0.89 | 0.24 | 5.5 | 6.8 |
| Properties of cured product | Bending elastic modulus (GPa) | | | | | 4.3 | 4.4 | 4.3 | 4.4 | 4 | 4.5 |
| | Toughness (MPa·m$^{0.5}$) | | | | | 1.3 | 1.8 | 1.2 | 1.2 | 1.1 | 1.4 |
| | Phase structure size (μm) | | | | | 4 | 0.2 | 3 | 1 | 0.04 | 0.3 |
| | Diameter of island phase (μm) | | | | | 0.8 | 0.9 | 1 | 0.2 | — | 0.1 |
| Properties of composite | Value of Charpy impact (J) | | | | | 10.7 | 12.9 | — | — | — | — |
| | Compression strength after impact (MPa) | | | | | — | — | 249 | 253 | 246 | 271 |
| | Compression strength of holed plate under hot-humid environment (MPa) | | | | | — | — | 262 | 268 | 260 | 279 |

TABLE 2-1

| Material for epoxy resin composition | | EEW | Number of functional group | Mn | SP | Comparative Example 1 | Comparative Example 2 | Comparative Example 3 | Comparative Example 4 | Comparative Example 5 |
|---|---|---|---|---|---|---|---|---|---|---|
| Diglycidyl ether-type epoxy resin | Epc830 | 170 | 2 | 340 | 13.5 | | | | | |
| | jER828 | 189 | 2 | 378 | 12.8 | | | | | 40 |
| | jER834 | 250 | 2 | 500 | 12.7 | | | 50 | 20 | |
| | YDF2001 | 475 | 2 | 950 | 13.2 | | | | | 20 |
| | jER4004P | 880 | 2 | 1760 | 13.0 | | | | | |
| | jER1007 | 1975 | 2 | 3950 | 12.2 | | | | | 40 |
| | jER4007P | 2270 | 2 | 4540 | 13.0 | | | | | |
| | jER1009 | 2850 | 2 | 5700 | 12.2 | | 50 | 25 | 10 | |
| Other epoxy resin | ELM120 | 118 | 3 | 354 | 15.3 | 100 | 50 | 25 | 70 | |
| | MY0510 | 101 | 3 | 303 | 15.3 | | | | | |
| | ELM434 | 120 | 4 | 480 | 14.9 | | | | | |
| | Modified TEPIC | 349 | 2.6 | 907 | 18.3 | | | | | |
| | jER154 | 178 | 6.5 | 1157 | | | | | | |
| | TMH574 | 214 | 3 | 642 | 14.0 | | | | | |
| | TEPIC-P | 106 | 3 | 318 | 21.3 | | | | | |

TABLE 2-1-continued

| | Material for epoxy resin composition | EEW | Number of functional group | Mn | SP | Comparative Example 1 | Comparative Example 2 | Comparative Example 3 | Comparative Example 4 | Comparative Example 5 |
|---|---|---|---|---|---|---|---|---|---|---|
| [D] or [D'] Curing agent | DICY-7 | | | | | 5 | 5 | 5 | 5 | 5 |
| | 4,4'-DDS | | | | | | | | | |
| | 3,3'-DDS | | | | | | | | | |
| Other components | Vinylec K | | | | | 3 | 3 | 3 | 3 | 3 |
| | PES | | | | | | | | | |
| | DCMU99 | | | | | 3 | 3 | 3 | 3 | 3 |
| Balance of SP values between [A] and [B] or [A'] and [B'] | | | | | | — | 3.1 | 3.1 | 3.1 | — |
| Content of [A] (parts by weight) | | | | | | 0 | 45 | 22 | 8 | 40 |
| Content of [A'] (parts by weight) | | | | | | 0 | 16 | 8 | 3 | 30 |
| Content of [B] ([B']) (parts by weight) | | | | | | 100 | 50 | 25 | 70 | 0 |
| Content of [C] (parts by weight) | | | | | | 0 | 3 | 50 | 19 | 19 |
| Content of [C'] (parts by weight) | | | | | | 0 | 4 | 51 | 21 | 57 |
| Content of [E] (parts by weight) | | | | | | 0 | 2 | 3 | 3 | 41 |
| Content of [E'] (parts by weight) | | | | | | 0 | 30 | 16 | 6 | 13 |
| Minimum viscosity of epoxy resin composition (Pa·s) | | | | | | — | — | — | — | — |
| Properties of cured product | Bending elastic modulus (GPa) | | | | | 5 | 4.4 | 4.3 | 4.8 | 3.3 |
| | Toughness (MPa·m$^{0.5}$) | | | | | 0.8 | 1.2 | 1.1 | 1 | 1.3 |
| | Phase structure size (μm) | | | | | homogeneous | 8 | homogeneous | homogeneous | homogeneous |
| | Diameter of island phase (μm) | | | | | — | 6 | — | — | — |
| Properties of composite | Value of Charpy impact (J) | | | | | 8.5 | 9.8 | 10.2 | 9.2 | 10.5 |
| | Compression strength after impact (MPa) | | | | | — | — | — | — | — |
| | Compression strength of holed plate under hot-humid environment (MPa) | | | | | — | — | — | — | — |

TABLE 2-2

| | Material for epoxy resin composition | EEW | Number of functional group | Mn | SP | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| Diglycidyl ether-type epoxy resin | Epc830 | 170 | 2 | 340 | 13.5 | | | | | | | |
| | jER828 | 189 | 2 | 378 | 12.8 | | 30 | 30 | | 30 | | |
| | jER834 | 250 | 2 | 500 | 12.7 | 30 | | | 30 | | | |
| | YDF2001 | 475 | 2 | 950 | 13.2 | | | | | | | |
| | jER4004P | 880 | 2 | 1760 | 13.0 | 40 | 30 | | 40 | | | |
| | jER1007 | 1975 | 2 | 3950 | 12.2 | | | | | | | |
| | jER4007P | 2270 | 2 | 4540 | 13.0 | | | | | | | |
| | jER1009 | 2850 | 2 | 5700 | 12.2 | | | 30 | | 30 | 15 | 15 |
| Other epoxy resin | ELM120 | 118 | 3 | 354 | 15.3 | | | 40 | | 40 | | |
| | MY0510 | 101 | 3 | 303 | 15.3 | | | | | | | |
| | ELM434 | 120 | 4 | 480 | 14.9 | | 40 | | | | 51 | 51 |
| | Modified TEPIC | 349 | 2.6 | 907 | 18.3 | | | | | | | |
| | jER154 | 178 | 6.5 | 1157 | | | | | | | | |
| | TMH574 | 214 | 3 | 642 | 14.0 | 30 | | | | | | |
| | TEPIC-P | 106 | 3 | 318 | 21.3 | | | | 30 | | | |
| [D] or [D'] Curing agent | DICY-7 | | | | | 5 | 5 | 5 | | | 2 | 2 |
| | 4,4'-DDS | | | | | | | | | | | |
| | 3,3'-DDS | | | | | | | | 30 | 30 | 29 | 29 |
| Other components | Vinylec K | | | | | 3 | 3 | 3 | | | | |
| | PES | | | | | | | | | | | 34 |
| | DCMU99 | | | | | 3 | 3 | 3 | | | | |
| Balance of SP values between [A] and [B] or [A'] and [B'] | | | | | | — | 1.9 | 3.1 | — | 3.1 | 3.1 | 3.1 |
| Content of [A] (parts by weight) | | | | | | 33 | 22 | 27 | 32 | 26 | 13 | 13 |
| Content of [A'] (parts by weight) | | | | | | 28 | 19 | 9 | 28 | 9 | 5 | 5 |
| Content of [B] ([B']) (parts by weight) | | | | | | 0 | 40 | 40 | 0 | 40 | 51 | 51 |

TABLE 2-2-continued

| | Material for epoxy resin composition | EEW | Number of functional group | Mn | SP | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| Content of [C] (parts by weight) | | | | | | 27 | 6 | 4 | 28 | 5 | 3 | 3 |
| Content of [C'] (parts by weight) | | | | | | 35 | 34 | 30 | 36 | 31 | 36 | 36 |
| Content of [E] (parts by weight) | | | | | | 40 | 32 | 29 | 40 | 29 | 33 | 33 |
| Content of [E'] (parts by weight) | | | | | | 37 | 7 | 21 | 36 | 20 | 8 | 8 |
| Minimum viscosity of epoxy resin composition (Pa·s) | | | | | | — | — | — | 0.49 | 0.73 | 0.56 | 33 |
| Properties of cured product | Bending elastic modulus (GPa) | | | | | 3.6 | 3.9 | 3.8 | 4.1 | 4.1 | 4.4 | 4.3 |
| | Toughness (MPa·m$^{0.5}$) | | | | | 0.8 | 0.7 | 0.8 | 0.8 | 0.7 | 0.8 | 1.2 |
| | Phase structure size (μm) | | | | | homogeneous | homogeneous | homogeneous | >10 | homogeneous | homogeneous | 0.2 |
| | Diameter of island phase (μm) | | | | | — | — | — | 5 | — | — | 0.07 |
| Properties of composite | Value of Charpy impact (J) | | | | | 8.6 | 8.5 | 9.0 | — | — | — | — |
| | Compression strength after impact (MPa) | | | | | — | — | — | 211 | 208 | 213 | 219 |
| | Compression strength of holed plate under hot-humid environment (MPa) | | | | | — | — | — | 249 | 252 | 259 | 244 |

INDUSTRIAL APPLICABILITY

The epoxy resin composition of the present invention have high elastic modulus at room temperatures and yield cured products excellent in toughness. Therefore, even when reinforcing fibers having particularly high tensile elastic modulus was used in combination, the fiber reinforced composite material excellent in static strength characteristics and excellent in impact resistance can be obtained. This allows high-elastic modulus fibers to be applied to applications and portions to which conventional products are not easily applied. Therefore, it is expected that a further reduction in weigh of fiber reinforced composite materials can be achieved in various fields.

The invention claimed is:

1. An epoxy resin composition comprising the following [A], [B], [C], and [D]:
   [A] a diglycidyl ether-type epoxy resin having a molecular weight of 1,500 or more;
   [B] an epoxy resin in which the solubility parameter value of a structural unit thereof is greater by 1.5 to 6.5 (cal/cm$^3$)$^{1/2}$ than the solubility parameter value of a structural unit of [A];
   [C] a diglycidyl ether-type epoxy resin having a molecular weight of 500 to 1,200; and
   [D] an epoxy resin curing agent,
in a content ratio that satisfies the following formulas (1) to (4):

$$0.2 \leq A/(A+B+C+E) \leq 0.6; \quad (1),$$

$$0.2 \leq B/(A+B+C+E) \leq 0.6; \quad (2),$$

$$0.15 \leq C/(A+B+C+E) \leq 0.4; \text{ and} \quad (3),$$

$$0 \leq E/(A+B+C+E) \leq 0.2, \quad (4)$$

wherein A, B, and C represent weights of [A], [B], and [C], respectively, and E represents a weight of an epoxy resin other than [A], [B], and [C].

2. The epoxy resin composition according to claim 1, wherein [B] is an amine-type epoxy resin.

3. The epoxy resin composition according to claim 2, wherein [D] is dicyandiamide or a derivative thereof.

4. The epoxy resin composition according to claim 1, wherein [D] is dicyandiamide or a derivative thereof.

5. A cured epoxy resin product prepared by curing the epoxy resin composition according to claim 1, wherein the cured epoxy resin product has a phase-separated structure including at least an [A]-rich phase and a [B]-rich phase, and wherein a structure period of the phase-separated structure is 0.01 to 5 μm.

6. A fiber reinforced composite material, comprising a combination of the cured epoxy resin product according to claim 5 and a reinforcing fiber base material.

7. A cured epoxy resin product prepared by curing the epoxy resin composition according to claim 1, wherein the cured epoxy resin product has a sea-island phase-separated structure including at least an [A]-rich phase and a [B]-rich phase, and wherein a diameter of islands of one phase is 0.01 to 5 μm.

8. A fiber reinforced composite material, comprising a combination of the cured epoxy resin product according to claim 7 and a reinforcing fiber base material.

9. A prepreg for a fiber reinforced composite material, comprising, as a matrix, the epoxy resin composition according to claim 1.

10. A fiber reinforced composite material prepared by curing the prepreg according to claim 9.

* * * * *